(12) United States Patent
Ding et al.

(10) Patent No.: US 10,369,525 B2
(45) Date of Patent: Aug. 6, 2019

(54) FILTRATION MEMBRANES WITH NANOSCALE PATTERNS

(71) Applicant: The Regents of the University of Colorado, a body corporate, Denver, CO (US)

(72) Inventors: Yifu Ding, Superior, CO (US); Sajjad Maruf, Boulder, CO (US); John Pellegrino, Boulder, CO (US); Alan Greenberg, Boulder, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 600 days.

(21) Appl. No.: 14/426,670

(22) PCT Filed: Sep. 6, 2013

(86) PCT No.: PCT/US2013/058609
§ 371 (c)(1),
(2) Date: Mar. 6, 2015

(87) PCT Pub. No.: WO2014/039894
PCT Pub. Date: Mar. 13, 2014

(65) Prior Publication Data
US 2015/0238908 A1    Aug. 27, 2015

Related U.S. Application Data

(60) Provisional application No. 61/697,599, filed on Sep. 6, 2012.

(51) Int. Cl.
*B29L 7/00*        (2006.01)
*B01D 61/02*    (2006.01)
(Continued)

(52) U.S. Cl.
CPC ....... *B01D 67/0032* (2013.01); *B01D 61/025* (2013.01); *B01D 61/145* (2013.01);
(Continued)

(58) Field of Classification Search
CPC .. B01D 67/0032; B01D 61/145; B01D 69/02; B01D 71/70; B01D 61/025; B01D 71/68;
(Continued)

(56) References Cited

U.S. PATENT DOCUMENTS 3,369,343 A * 2/1968 Robb .................. A62B 9/00
128/200.25
4,277,344 A * 7/1981 Cadotte ................ B01D 69/125
210/490

(Continued)

FOREIGN PATENT DOCUMENTS

CN    101470355 A    7/2009
CN    102167281 A    8/2011
(Continued)

OTHER PUBLICATIONS

Notice of Chinese Patent Application Publication No. 201380058147.X dated Sep. 23, 2015, 41 pages. English translation.
(Continued)

*Primary Examiner* — David C Mellon

(57) ABSTRACT

A membrane for fluid transfer includes a base membrane and a pattern, that covers a working area of a surface thereof, formed of a compatible material. The pattern has periodicity and/or amplitude that do not exceed 1 micrometer. A method of filtering a component from a solution includes passing the solution comprising the component through a membrane that includes a base membrane. The base membrane and a pattern that covers a working area of a surface thereof are formed of materials compatible with the solution. The pattern has periodicity and/or amplitude that do not exceed
(Continued)

1 micrometer, and reduces mass transfer of surface-accumulative soluble and/or suspended species and particulates from the solution to the membrane while the solution is passed through the membrane. A method of producing a membrane for fluid transfer includes forming a nanoscale pattern over a working area of a polymer membrane.

32 Claims, 12 Drawing Sheets

(51) Int. Cl.
    B01D 61/14       (2006.01)
    B01D 65/08       (2006.01)
    B01D 67/00       (2006.01)
    B01D 69/02       (2006.01)
    B01D 71/68       (2006.01)
    B01D 71/70       (2006.01)
    B29C 59/02       (2006.01)

(52) U.S. Cl.
    CPC ....... *B01D 61/147* (2013.01); *B01D 67/0002* (2013.01); *B01D 69/02* (2013.01); *B01D 71/68* (2013.01); *B01D 71/70* (2013.01); *B29C 59/02* (2013.01); *B01D 65/08* (2013.01); *B01D 2325/08* (2013.01); *B29L 2007/00* (2013.01)

(58) Field of Classification Search
    CPC .. B01D 61/147; B01D 67/0002; B01D 65/08; B01D 2325/00; B01D 2313/143; B01D 2325/08; B29C 59/02; B29L 2007/00
    See application file for complete search history.

(56) References Cited

U.S. PATENT DOCUMENTS

| | | | |
|---|---|---|---|
| 2004/0011723 | A1 | 1/2004 | Bradford et al. |
| 2006/0040058 | A1 | 2/2006 | Heidari et al. |
| 2010/0282680 | A1* | 11/2010 | Su ............... B01D 67/0088 210/640 |
| 2012/0058302 | A1* | 3/2012 | Eggenspieler ......... B01D 65/08 428/141 |
| 2012/0125848 | A1 | 5/2012 | Friedberger et al. |
| 2013/0059113 | A1* | 3/2013 | Hatton .................... B08B 17/06 428/116 |
| 2014/0265013 | A1* | 9/2014 | Chou ................... G01N 21/648 264/220 |
| 2016/0214069 | A1* | 7/2016 | Ding ...................... B01D 69/02 |
| 2017/0002159 | A1* | 1/2017 | Ahn ...................... C08F 220/18 |

FOREIGN PATENT DOCUMENTS

| | | | | |
|---|---|---|---|---|
| EP | 2892638 | A1 | 7/2015 | |
| KR | 20150053960 | A | 5/2015 | |
| WO | 2010/056034 | A2 | 5/2010 | |
| WO | WO-2011094344 | A1 * | 8/2011 | ............. B08B 17/06 |
| WO | 2014/039894 | A1 | 3/2014 | |

OTHER PUBLICATIONS

Notification of the First Office Action for Chinese Patent Application No. 201380058147.X, 17 pages. English translation.
Lou, M L, et al., "Hydrophilic modification of poly (ether sulfone) ultrafiltration membrane surface by self-assembly of Ti02 nanoparticles", Applied Surface Science, Elsevier, Amsterdam, NL, vol. 249, No. 1-4, (Aug. 15, 2005) pp. 76-84.
Asatekin, A., et al., "Fouling Resistant, High Flux Nanofiltration Membranes from Polyacrylonitrile-Graft-Poly (Ethylene Oxide)." *Journal of Membrane Science* 332 (2009): 6-12. Print.
Bacchin, P., et al., "Critical and Sustainable Fluxes: Theory, Experiments and Applications." *Journal of Membrane Science* 281 (2006): 42-69. Print.
Carman, M. L., et al., "Biofouling: The Journal of Bioadhesion and Biofilm Research." *Bioufouling* 22.1 (2006): 11-21. Print.
Cassie, A. B. D., et al., "Wettability of Porous Surfaces." *Transactions of the Faraday Society* 40 (1944): 546-551. Print.
Choo, K. H., et al., "Membrane Fouling Mechanisms in the Membrane-Coupled Anaerobic Bioreactor." *Wat. Res* 30.8 (1996): 1771-1780. Print.
Chou, S. Y., et al., "Imprint Lithography with 25-Nanometer Resolution." *Science* 272 (1996): 85-87. Print.
Chou, S. Y., et al., "Nanoimprint Lithography." *J. Vac. Sci. Technol. B.* 14.6 (1996): 4129-4133. Print.
Cottin-Bizonne, C., et al., "Low-Friction Flows of Liquid at Nanopatterned Interfaces." *Nature Materials* 2 (2003): 237-240. Print.
Ding, Y., et al., "Thermodynamic Underpinnings of Cell Alignment on Controlled Topographies." *Advanced Materials* 23 (2011): 421-425. Print.
Mc Donogh, R. M., et al., "Experimental in Situ Measurement of Concentration Polarisation During Ultra- and Micro-Filtration of Bovine Serum Albumin and Dextran Blue Solutions." *Journal of Membrane Science* 104 (1995): 51-63. Print.
Elimelech, M., et al., "Role of Membrane Surface Morphology in Colloidal Fouling of Cellulose Acetate and Composite Aromatic Polymide Reverse Osmosis Membranes." *Journal of Membrane Science* 127 (1997): 101-109. Print.
Espinasse, B., et al., "On an Experimental Method to Measure Critical Flux in Ultrafiltration." *Desalination* 146 (2002): 91-96. Print.
Feng, L., et al., "Super-Hydrophobic Surfaces: From Natural to Artificial." *Advanced Materials* 14.24 (2002): 1857-1860. Print.
Field, R. W., et al., "Critical Flux Concept for Microfiltration Fouling." *Journal of Membrane Science* 100 (1995): 259-272. Print.
Fradin, B., et al., "Crossflow Microfiltration of Magnesium Hydroxide Suspensions: Determination of Critical Fluxes, Measurement and Modelling of Fouling." *Separation and Purification Technology* 16 (1999): 25-45. Print.
Gancarz, I., et al., "Modification of Polysulfone Membranes 3. Effect of Nitrogen Plasma." *European Polymer Journal* 36 (2000): 1563-1569. Print.
Gancarz, I., et al., "Modification of Polysulfone Membranes 1. $CO_2$ Plasma Treatment." *European Polymer Journal* 35 (1999): 1419-1428. Print.
Gésan-Guiziou, G., et al., "Stability of Latex Crossflow Filtration: Cake Properties and Critical Conditions of Deposition." *Chemical Engineering Journal* 85 (2002): 27-34. Print.
Guo, L. J., "Nanoimprint Lithography: Methods and Materials Requirements." *Advanced Materials* 19 (2007): 495-513. Print.
Hashino, M., et al., "Effect of Surface Roughness of Hollow Fiber Membranes with Gear-Shaped Structure on Membrane Fouling by Sodium Alginate." *Journal of Membrane Science* 366 (2011): 389-397. Print.
Hirose, M., et al., "Effect of Skin Layer Surface Structures on the Flux Behaviour of RO Membranes." *Journal of Membrane Science* 121 (1996): 209-215. Print.
Howell, J. A., "Sub-Critical Flux Operation of Microfiltration." *Journal of Membrane Science* 107 (1995): 165-171. Print.
Hu, M. X., et al., "Enhancing the Hydrophilicity of Polypropylene Microporous Membranes by the Grafting of 2-hydroxyethyl Methacrylate Via a Synergistic Effect of Photoinitiators." *Journal of Membrane Science* 285 (2006): 196-205. Print.
Izák, P., et al., "3D Topography Design of Membranes for Enhanced Mass Transport." *Journal of Membrane Science* 321 (2008): 337-343. Print.
Kilduff, J. E., et al., "Photochemical Modification of Poly(Ether Sulfone) and Sulfonated Poly(Sulfone) Nanofiltration Membranes for Control of Fouling by Natural Organic Matter." *Desalination* 132 (2000): 133-142. Print.
Kim, I.C., et al., "Dyeing Process Wastewater Treatment Using Fouling Resistant Nanofiltration and Reverse Osmosis Membranes." *Desalination* 192 (2006): 246-251. Print.

(56) References Cited

OTHER PUBLICATIONS

Kim, K. S., et al., "Surface Modification of Polysulfone Ultrafiltration Membrane by Oxygen Plasma Treatment." *Journal of Membrane Science* 199 (2002): 135-145. Print.
Kwon, D. Y., et al., "Experimental Determination of Critical Flux in Cross-Flow Microfiltration." *Separation and Purification Technology* 19 (2000): 169-181. Print.
Lazarova, V., et al., "Advanced Wastewater Disinfection Technologies: State of the Art and Perspectives." *Wat. Sci. Tech.* 40.4-5 (1999): 203-213. Print.
Le-Clech, P., et al., "Fouling in Membrane Bioreactors Used in Wastewater Treatment" *Journal of Membrane Science* 284 (2006): 17-53. Print.
Li, R. H., et al., "Performance of Poly(vinyl alcohol) Thin-Gel Composite Ultrafiltration Membranes." *Journal of Membrane Science* 105 (1995): 71-78. Print.
Long, C. J., et al., "Engineered Antifouling Microtopographies: Mapping Preferential and Inhibitory Microenvironments for Zoospore Attachment." *Biofouling* 26.8 (2010): 941-952. Print.
Ma, X., et al., "Enhancing the Antifouling Property of Polyethersulfone Ultrafiltration Membranes Through Surface Adsorption-Crosslinking of Poly(Vinyl Alcohol)." *Journal of Membrane Science* 300 (2007): 71-78. Print.
Maartens, A., et al., "Membrane Pretreatment: A Method for Reducing Fouling by Natural Organic Matter." *Journal of Colloid and Interface Science* 221 (2000): 137-142. Print.
Marmur, A., "The Lotus Effect: Superhydrophobicity and Metastability." *Langmuir* 20 (2004): 3517-3519. Print.
Martines, E., et al., "Superhydrophobicity and Superhydrophilicity of Regular Nanopatterns." *Nano Letters* 5.10 (2005): 2097-2103. Print.
Maruf, S. H., et al., "Glass Transition Behaviors of Interfacially Polymerized Polyamide Barrier Layers on Thin Film Composite Membranes Via Nano-Thermal Analysis." *Polymer* 52 (2011): 2643-2649. Print.
Michielsen, S., et al., "Design of a Superhydrophobic Surface Using Woven Structures." *Langmuir* 23 (2007): 6004-6010. Print.
Nijdam, W., et al., "High Performance Micro-Engineered Hollow Fiber Membranes by Smart Spinneret Design." *Journal of Membrane Science* 256 (2005): 209-215. Print.
Petronis, S., et al., "Design and Microstructuring of PDMS Surfaces for Improved Marine Biofouling Resistance." *Journal of Biomaterials Science: Polymer Edition* 11.10 (2000): 1051-1072. Print.
Porter, M. C., "Concentration Polarization with Membrane Ultrafiltration." *Ind. Eng. Chem. Prod. Res. Develop* 11.3 (1972): 234-248. Print.
Potts, D. E., et al., "A Critical Review of Fouling of Reverse Osmosis Membranes." *Desalination* 36 (1981): 235-264. Print.
Rácz, I. G., et al., "Mass Transfer, Fluid Flow and Membrane Properties in Flat and Corrugated Plate Hyperfiltration Modules." *Desalination* 60 (1986): 213-222. Print.
Rana, D., et al., "Surface Modification for Antifouling Membranes." *Chem. Rev.* 110 (2010): 2448-2471. Print.
Reddy, A. V. R., et al., "Surface Modification of Ultrafiltration Membranes by Preadsorption of a Negatively Charged Polymer I. Permeation of Water Soluble Polymers and Inorganic Salt Solutions and Fouling Resistance Properties." *Journal of Membrane Science* 214 (2003): 211-221. Print.
Richert L., et al., "Surface Nanopatterning to Control Cell Growth." *Advanced Materials* 20 (2008): 1488-1492. Print.
Schumacher, J. F., et al., "Engineered Antifouling Microtopographies—Effect of Feature Size, Geometry, and Roughness on Settlement of Zoospores of the Green Alga Ulva." *Biofouling* 23.1 (2007): 55-62. Print.
Shirtcliffe, N. J., et al., "Dual-Scale Roughness Produces Unusually Water-Repellent Surfaces." *Advanced Materials* 16.21 (2004): 1929-1932. Print.
Song, L., et al., "Theory of Concentration Polarization in Crossflow Filtration." *J. Chem. Soc. Faraday Trans.* 91.19 (1995): 3389-3398. Print.
Stengaard, F. F., "Characteristics and Performance of New Types of Ultrafiltration Membranes with Chemically Modified Surfaces." *Desalination* 70 (1988): 207-224. Print.
Ulbricht, M., "Advanced Functional Polymer Membranes." *Polymer* 47 (2006): 2217-2262. Print.
Van Den Berg, G. B., et al., "Diffusional Phenomena in Membrane Separation Processes." *Journal of Membrane Science* 73 (1992): 103-118. Print.
Van Der Bruggen, B., et al., "A Review of Pressure-Driven Membrane Processes in Wastewater Treatment and Drinking Water Production." *Environmental Progress* 22.1 (2003): 46-56. Print.
Van Der Waal, M. J., et al., "Mass Transfer in Corrugated-Plate Membrane Modules. I. Hyperfiltration Experiments." *Journal of Membrane Science* 40 (1989): 243-260. Print.
Varol, S. S., et al., "Laminar Flow and Mass Transfer in Channels with a Porous Bottom Wall and With Fins Attached to the Top Wall." *Heat and Mass Transfer* 36 (2000): 103-108. Print.
Vogelaar, L., et al., "Phase Separation Micromolding: A New Generic Approach for Miscrostructuring Various Materials." *Small* 1.6 (2005): 645-655. Print.
Vogelaar, L., et al., "Paso Separation Micromolding—PSµM." *Advanced Materials* 15.16 (2003): 1385-1389. Print.
Vrijenhoek, E. M., et al., "Influence of Membrane Surface Properties on Initial Rate of Colloidal Fouling of Reverse Osmosis and Nanofiltration Membranes." *Journal of Membrane Science* 188 (2001): 115-128. Print.
Wang, P., et al., "Synthesis, Characterization and Anti-Fouling Properties of Poly(Ethylene Glycol) grafted Poly(Vinylidene Fluoride) Copolymer Membranes." *Journal of Materials Chemistry* 11 (2001): 783-789. Print.
Wenzel, R. N., "Resistance of Solid Surfaces to Wetting by Water." *Industrial and Engineering Chemistry* 28.8 (1936): 988-994. Print.
Yan, L., et al., "Effect of Nano-Sized $Al_2O_3$-Particle Addition on PVDF Ultrafiltration Membrane Perfomance." *Journal of Membrane Science* 276 (2006): 162-167. Print.
Zhu, X., et al., "Colloidal Fouling of Reverse Osmosis Membranes: Measurements and Fouling Mechanisms." *Envron. Sci. Technol.* 31(1997): 3654-3662. Print.
International Search Report and Written Opinion dated Dec. 11, 2013 for International Patent Application No. PCT/US2013/058609 filed on Sep. 6, 2013, 12 pages.
International Preliminary Report on Patentability dated Mar. 19, 2015 for International Patent Application No. PCT/US2013/058609 filed on Sep. 6, 2013, 8 pages.
CN Patent Application No. 201380058147.X filed Sep. 6, 2013, CN/EP Office Action dated Jan. 23, 2017, all pages.
Vrijenhoek, Eric M., et al., "Influence of membrane surface properties on initial rate of colloidal fouling of reverse osmosis and nanofiltration membranes", "Journal of Membrane Science," Feb. 9, 2001_all pages.
Hobbs, et al., "Effect of surface roughness on fouling of RO and NF membranes during filtration of a high organic surficial groundwater," "Journal of Water Supply: Research and Technology—AQUA", May 20, 2006_all pages.
Lee, et al., "Flow analysis and fouling on the patterned membrane surface," "Journal of Membrane Science", Oct. 17, 2012_all pages.
Hashino, et al., "Effect of surface roughness of hollow fiber membranes with gear-shaped structure on membrane fouling by sodium alginate," "Journal of Membrane Science", Oct. 16, 2010_all pages.
Girones, et al., "Polymeric microsieves produced by phase separation micromolding," "Journal of Membrane Science", Jul. 14, 2006_all pages.
Culfaz, et al., "Fouling Behavior of Microstructured Hollow Fiber Membranes in Dead-End Filtrations: Critical Flux Determination and NMR Imaging of Particle Disposition," "American Chemical Society: Langmuir Article", Nov. 13, 2010_all pages.
Culfaz et al., "Microstructured hollow fibers for ultrafiltration," "Journal of Membrane Science 347 (2010) 32-41", Oct. 12, 2009_all pages.
Chen et al., "Geometric Control of Cell Life and Death," "SCIENCE", vol. 276, May 30, 1997_all pages. Retrieved from: www.sciencemag.org.

(56) References Cited

OTHER PUBLICATIONS

Carmen, et al., "Engineered antifouling microtopographies—correlating wettability with cell attachment," "Biofouling, 22:1, 11-21, DOI: 10.1080/08927010500484854", Jan. 25, 2007_all pages.
Wang, et al., "Programmable, Pattern-Memorizing Polymer Surface," "Advanced Materials", Jul. 8, 2011, vol. 23_pp. 3669-3673.
Zhihong Nie et al, "Patterning surfaces 1-15 with functional polymers," Nature Materials, vol. 7, No. 4, Apr. 1, 2008 (Apr. 1, 2008), pp. 277-290.
EP13836142.3, Extended European Search Report, dated Apr. 29, 2016, 9 pages.
IL237608, Office Action, dated Jan. 15, 2018, 4 pages.

\* cited by examiner

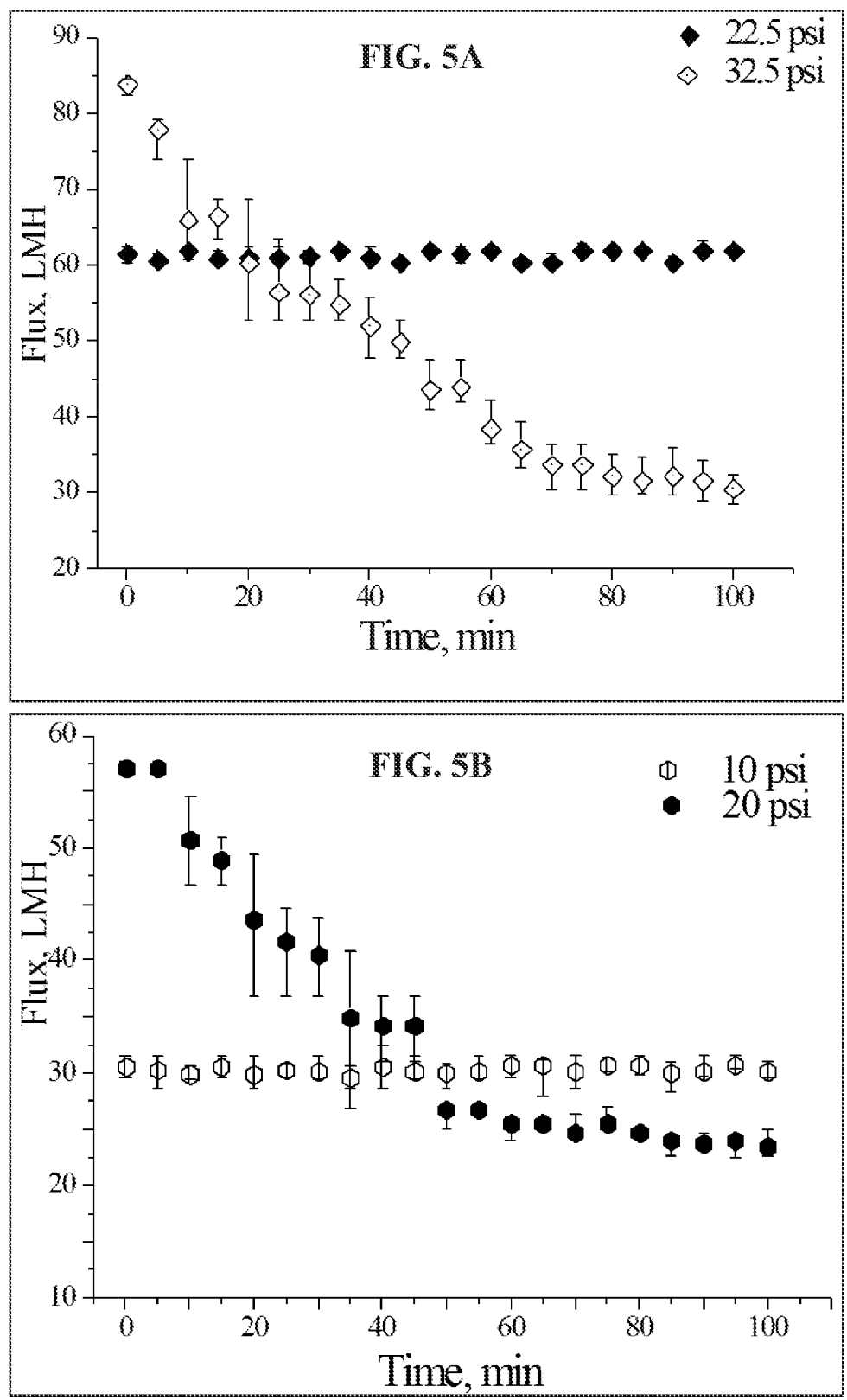

FIG. 6A
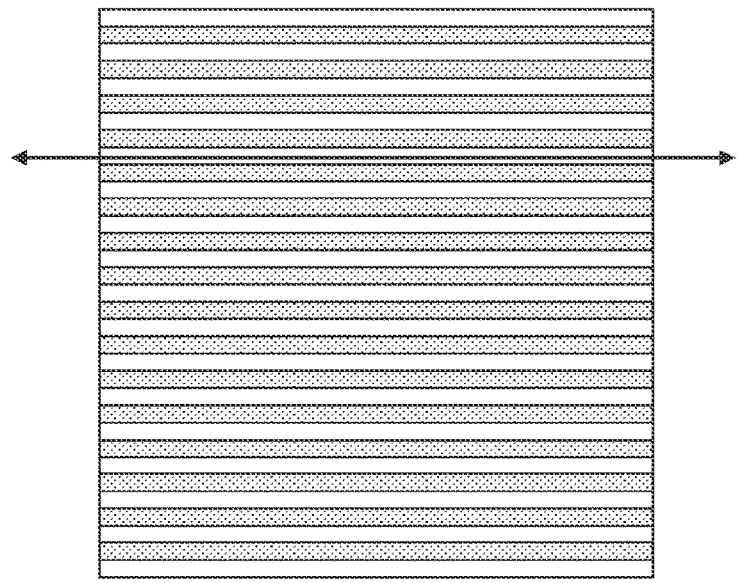
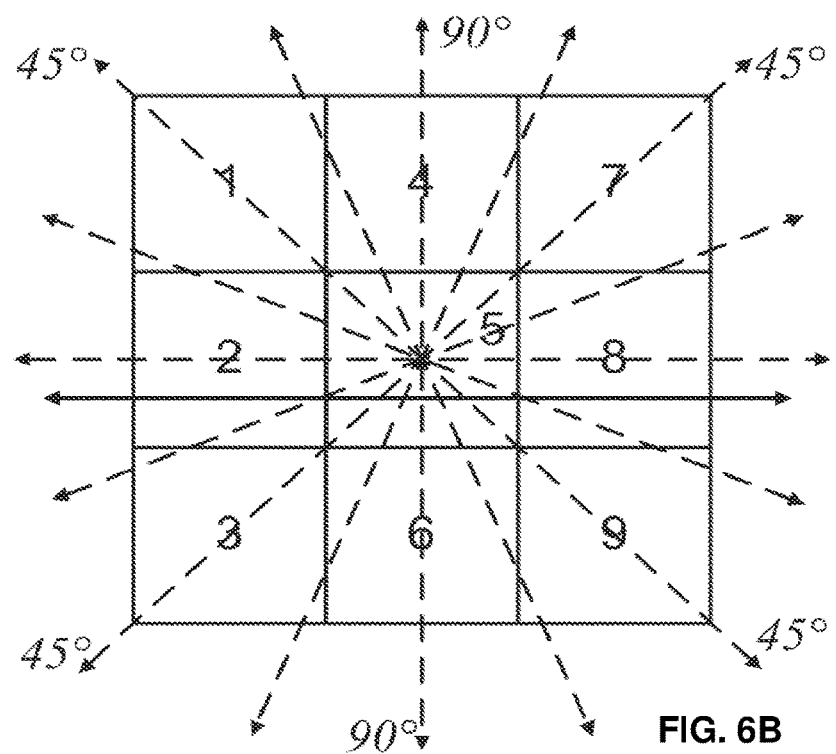
FIG. 6B

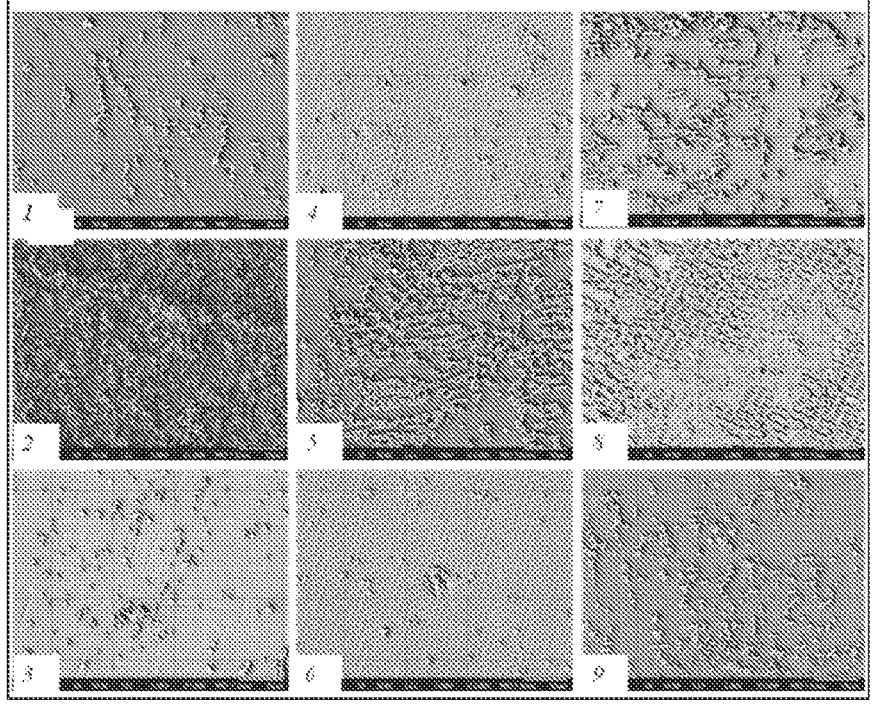
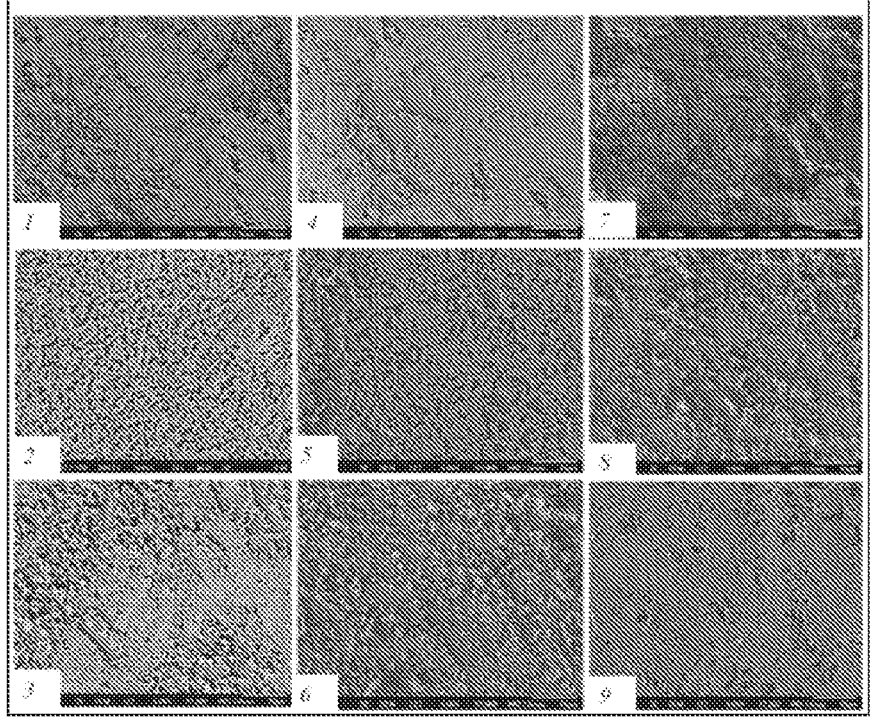

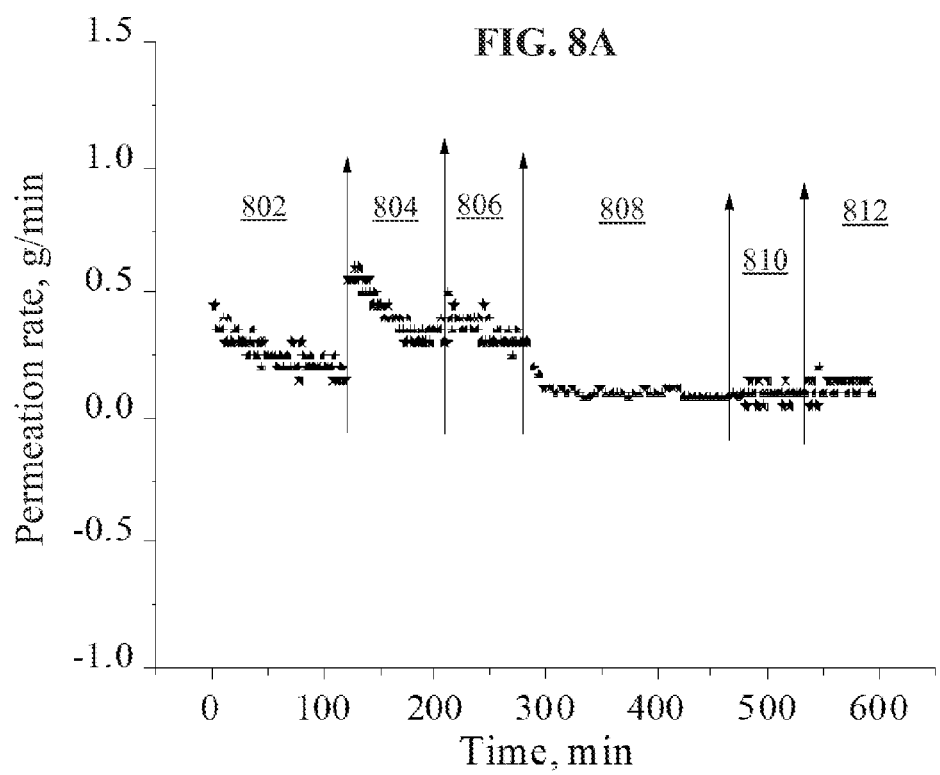
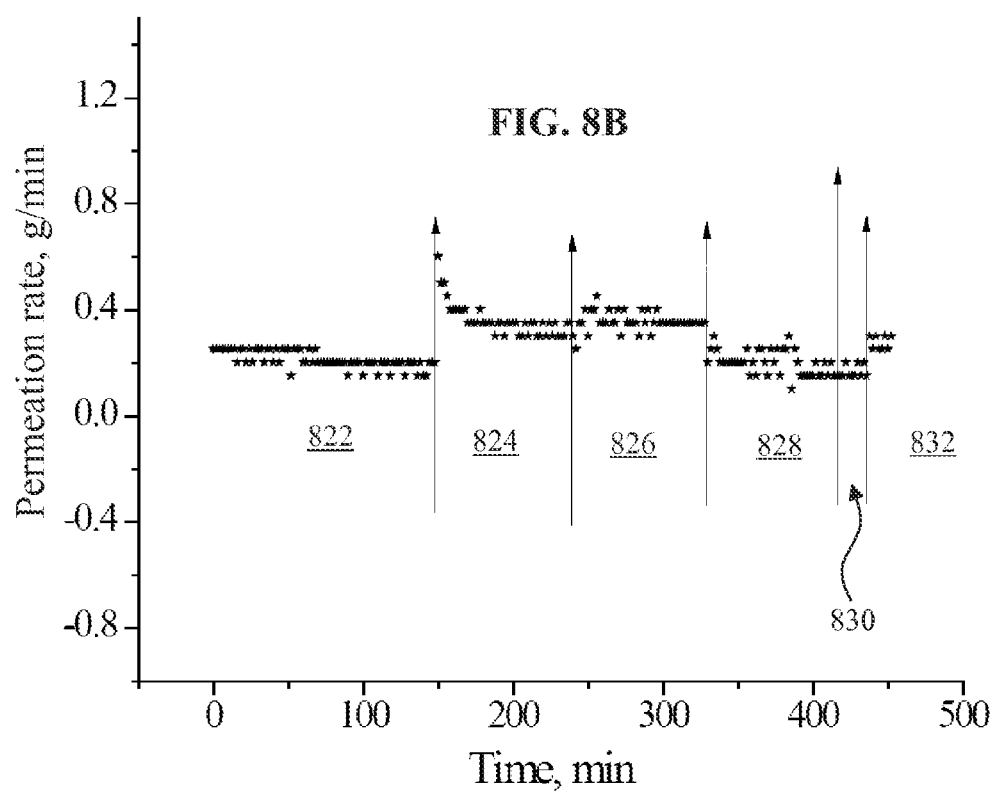

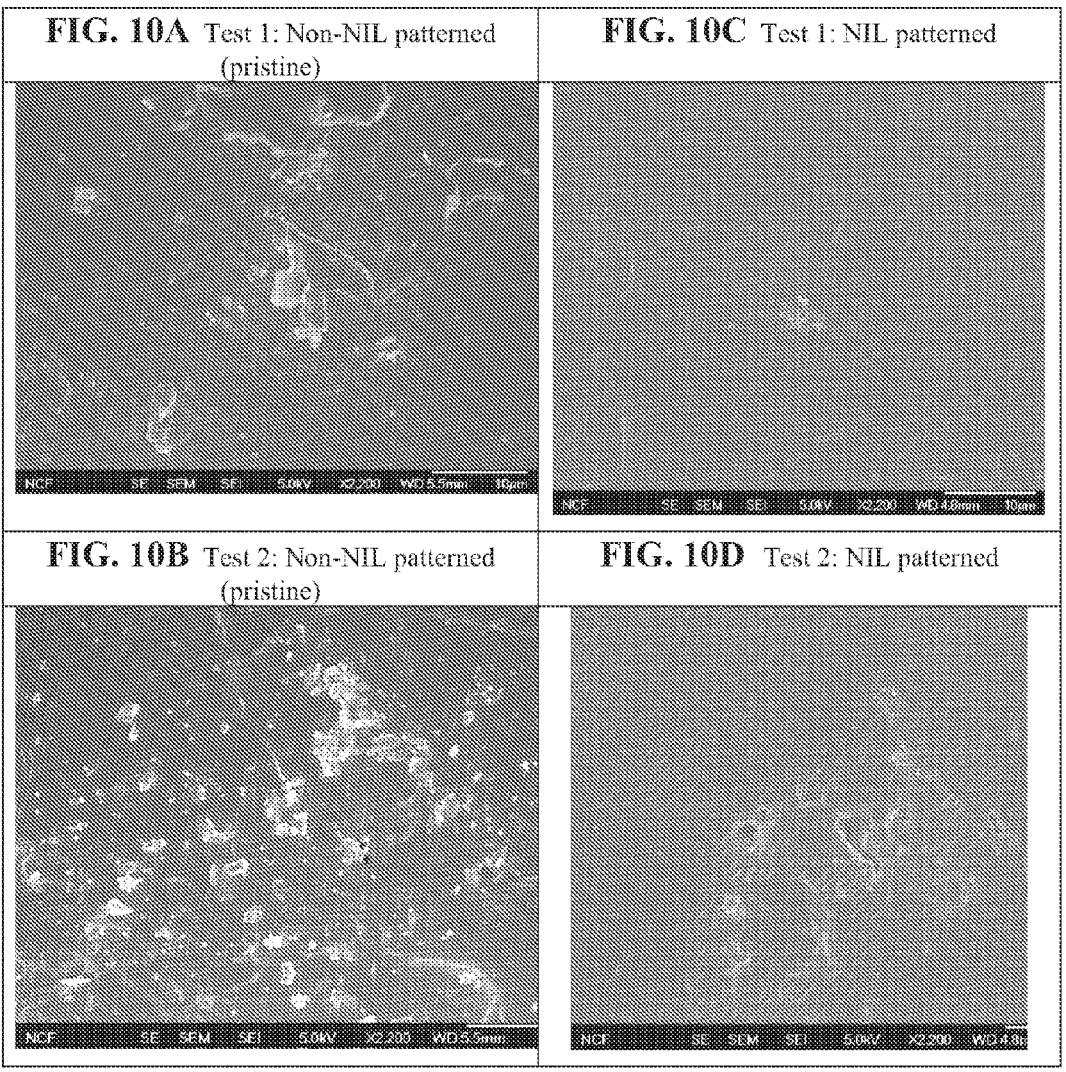

FILTRATION MEMBRANES WITH NANOSCALE PATTERNS

RELATED APPLICATIONS

This applications is a 35 U.S.C. § U.S. National Stage Entry of PCT Applications Ser. No. PCT/US2013/058609 (WO 2014/039894 A1) filed on Sep. 6, 2013, which claims priority to U.S. Provisional No. 61/697,599, filed on Sep. 6, 2012. Both of the above-identified applications are incorporated herein in their entirety by reference.

BACKGROUND

Polymeric membranes have gained an important place in pressure driven separation technology and are used in a broad range of applications. Because of their control of the permeation of chemical species through the material, they play crucial roles in various technological processes. Despite all their advantages, continuous operation of these membranes are hindered by fouling phenomena such as deposition of retained particles, colloids, macromolecules, salts, etc., at the membrane surface, inside pores or at pore walls, resulting in a reduction in the permeation/flux from the initial rate [1-3].

Fouling starts in the form of "concentration polarization" where concentrations of rejected components build up near a membrane surface. This can increase the effective osmotic pressure across the membrane, cause a gel-layer of macromolecules, lead to precipitation of sparingly-soluble salts, or initiate deposition of a particulate cake near the membrane surface [4, 5]. In its earliest stage, fouling is reversible, as an initial permeation/flux can be often be restored by stopping filtration, or performing light flushing, such as applying back pressure. As the concentration of the rejected materials builds up, the membrane may become more tenaciously fouled, resulting in a much harder-to-reverse flux decline that requires more complex cleaning to reverse, and in fact may become irreversible. When flux decline occurs, hydraulic resistance is increased as a cake/fouled layer exerts additional resistance known as "cake resistance" [6, 7]. To address fouling, different types of pretreatment and cleaning protocols have been developed and used by specific process industries. In general, flux decline increases energy consumption (e.g., in order to maintain a targeted fluid throughput) and limits membrane lifetime due to the irreversible component as mentioned previously [1, 2]. Hence, much effort has been applied in the field of membrane technology to mitigate fouling.

Membrane separation processes, along with fouling, are predominantly surface phenomena [3, 8]. Numerous studies have been conducted in modifying the surface of membranes to reduce fouling. Among these efforts, many have aimed at changing surface energy, such as, increasing hydrophilicity of the membrane, since many fouling species are suspected of favoring adsorption on hydrophobic surfaces [3]. Adsorption of various surfactants and polymers has been utilized to increase the hydrophilicity of the membrane [9-11]. Also, much work has been done on coating polyvinyl alcohol (PVA) and polyethylene glycol (PEG) based polymers onto the membrane surface [12-14]. Surface grafting of PEG-based polymers and hydroxyethyl methacrylate are among the often-used techniques to modify the membrane surface [15-17]. In addition, various plasma treatments using $CO_2$, $N_2$, $O_2$ and UV have been utilized to increase hydrophilicity of the membrane surface [18-21]. However, wider application of all these processes has been limited, as many are done under hazardous conditions. In addition, grafting and coating tends to be impermanent and, most of these techniques are expensive to do at an industrial scale [3, 22].

SUMMARY

Many of the foregoing challenges are addressed by the present invention, which provides a membrane for fluid transfer comprising a pattern formed by nanolithography and having features with periodicity and amplitude, which act to resist fouling. The membrane of the present invention may be a filtration membrane. Filtration membranes include membranes suitable for nanofiltration, ultrafiltration, microfiltration, and reverse osmosis.

The present invention further provides a membrane comprising raised or depressed portions on the surface of the membrane to form shapes, wherein the depth of the valley between the shapes, or amplitude, is between 50 and 500 nm. In certain embodiments, the shapes are arranged to have a periodicity of between 10 and 1500 nm or between 400 and 1000 nm. In other embodiments, the shapes are arranged to have a periodicity of about 834 nm.

In certain embodiments of the membrane, the amplitude is between 10 and 300 nm. In other embodiments, the amplitude is about 200 nm. In certain embodiments, the space between shapes, or the valley, is between 200 and 800 nm in width or between 300 and 600 nm in width. In other embodiments, the valley is about 400 nm in width.

In certain embodiments of the membrane, the membrane has a molecular weight cut off (MWCO) of between 0.1 and 1000 kDa. In other embodiments, the membrane includes poly(ethersulfone).

The present invention provides a method of filtering a component from a fluid using the membrane described herein. The fluid may be a liquid or a gas. In certain embodiments, the liquid is a polar solvent.

In certain embodiments, the present invention provides a method of filtering a component from an aqueous solution comprising passing the aqueous solution comprising the component through the membrane described herein. In certain embodiments, the component has a molecular weight of between 0.1 and 1000 kDa. In other embodiments, the filtration is performed at room temperature. Room temperature can be about 21° C.

In certain embodiments of the method of filtering, the filtration is performed at a pressure between 6 and 51 psi. In other embodiments, the filtration is performed at a subcritical flux. In specific embodiments, the critical flux is above 40 $L \cdot m^{-2} \cdot h^{-1}$ or between 40 and 60 $L \cdot m^{-2} \cdot h^{-1}$ when the component has an average particle size of 250 nm in diameter. In certain embodiments, the membrane has a valley width of about 400 nm under the above parameters.

In specific embodiments, the critical flux is above 60 $L \cdot m^{-2} \cdot h^{-1}$ or between 60 and 90 $L \cdot m^{-2} \cdot h^{-1}$ when the component has an average particle size of 500 nm in diameter. In certain embodiments, the membrane has a valley width of about 400 nm under the above parameters.

The disclosure also provides a method of producing the membrane, described herein, comprising nanoimprint lithography (NIL). The NIL can be thermal embossing NIL or step-and-flash NIL.

In certain embodiments of the methods of producing the membrane, described herein, thermal embossing NIL includes providing a membrane; pressurizing the membrane in a rigid mold under a pressure of about 3-7 MPa; heating the membrane to a temperature that may be higher or lower than the glass transition temperature of the membrane;

cooling the membrane to a temperature lower than the glass transition temperature of the membrane; and separating the membrane from the mold; thereby producing the membrane described herein.

In another embodiment of the method of producing the membranes described herein, the thermal embossing NIL includes providing a membrane; pressurizing the membrane in a rigid mold under a pressure of about 3-7 MPa; heating the membrane to a temperature between 100 and 150° C.; cooling the membrane to a temperature lower than the glass transition temperature of the membrane; and separating the membrane from the mold; thereby producing the membrane described herein.

In certain embodiments of the methods of producing the membrane described herein, the rigid mold is made of silicon, polymer, metal, glass, ceramic, composite or combinations thereof. In certain embodiments, the pressurizing step is performed at a pressure of about 4 MPa. In other embodiments, the membrane is heated to a temperature of about 120° C. during the heating step. In certain embodiments, the heating and pressurization steps is performed in about 180 seconds, while in other embodiments the heating and pressurization steps are performed in a shorter amount of time for high throughput. In other embodiments, the membrane was cooled to a temperature of about 40° C. before being separated from the mold.

In a certain embodiment, the membrane described and used in the methods above is an ultrafiltration membrane.

In an embodiment, a membrane for fluid transfer includes a base membrane having a first surface and a second surface counterfacing the first surface, and a pattern, formed of a material compatible with the base membrane, that covers a working area of the first surface, the pattern forming features with periodicity and amplitude that do not exceed 1 micrometer in size.

In an embodiment, a method of filtering a component from a solution includes passing the solution comprising the component through a membrane. The membrane includes a base membrane having a first surface and a second surface counterfacing the first surface. The base membrane includes a material compatible with the solution, and a pattern that includes a material compatible with the base membrane and the solution, that covers a working area of the first surface. The pattern forms features with periodicity and amplitude that do not exceed 1 micrometer in size. The pattern reduces mass transfer of surface-accumulative soluble and/or suspended species and particulates from the solution to the membrane while the solution is passed through the membrane, as opposed to mass transfer of the surface-accumulative soluble and/or suspended species and particulates from the solution to the base membrane without the pattern.

In an embodiment, a method of producing a membrane for fluid transfer includes forming a nanoscale pattern over a working area of a polymer membrane.

BRIEF DESCRIPTION OF THE DRAWINGS

FIG. 5A is a line graph showing time dependent experimental data for a colloidal suspension with a patterned membrane, in accord with an embodiment.

FIG. 5B is a line graph showing time dependent experimental data for a colloidal suspension with a pristine membrane, in accord with an embodiment.

FIG. 6A is a schematic showing a NIL-patterned membrane direction, in accord with an embodiment.

FIG. 6B is a schematic showing nine segments of an NIL-patterned membrane that were chosen for SEM analysis, with patterning in the direction represented in FIG. 6A, with arrows indicating direction of radial flow from a central jet.

FIG. 7A shows SEM images of the nine segments of fouled NIL-patterned membrane schematically shown in FIG. 6B.

FIG. 7B shows SEM images of nine segments of fouled non-patterned (pristine) membrane.

FIG. 8A illustrates productivity of a non-NIL-patterned membrane (pristine), with data shown sequentially for different measurement scenarios.

FIG. 8B illustrates productivity (vertical axis) of a NIL-patterned membrane, with data shown sequentially for different measurement scenarios.

FIG. 10A shows an SEM image illustrating BSA deposition on the surface of a non-NIL patterned membrane (pristine) in a first test.

FIG. 10B shows an SEM image illustrating BSA deposition on the surface of a non-NIL patterned membrane (pristine) in a second test.

FIG. 10C shows an SEM image illustrating BSA deposition on the surface of a NIL patterned membrane in a first test, in accord with an embodiment.

FIG. 10D shows an SEM image illustrating BSA deposition on the surface of a NIL patterned membrane in a second test, in accord with an embodiment.

DETAILED DESCRIPTION

Figure 1A:
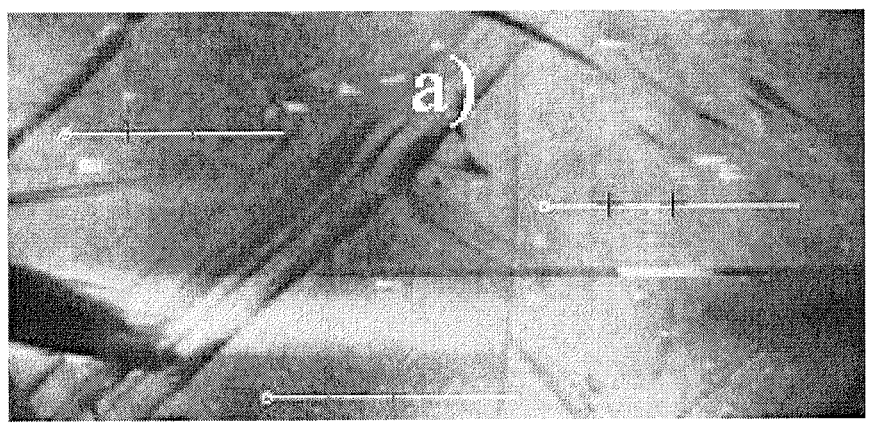
FIG. 1A shows a topographic AFM image of a pristine membrane.

Provided herein is a membrane for fluid transfer that includes a base membrane having a first surface and a second surface counterfacing the first surface, and a pattern, formed of the same material as, or a material compatible with, the base membrane, that covers a working area of the first surface. The pattern forms features with periodicity and amplitude that do not exceed 2 micrometers in size. Also provided herein is a method for producing such membranes, as well as an apparatus for performing nanolithography to form the pattern on the base membrane.

While the invention has been described and disclosed below in connection with certain embodiments and procedures, it is not intended to limit the invention to those specific embodiments. Rather, it is intended to cover all such alternative embodiments and modifications as would fall within the spirit and scope of the invention.

To facilitate the understanding of this invention, a number of terms are defined below. Terms defined herein have meanings as commonly understood by a person of ordinary skill in the art. Terms such as "a", "an", and "the" are not intended to refer to only a single entity, but include the general class of which a specific example may be used for illustration. The terminology herein is used to describe specific embodiments of the invention, but their usage does not delimit the invention.

The term "about" or "approximately" usually means within 20%, more preferably within 10%, and most preferably still within 5% of a given value or range.

As used herein, a "membrane" is a barrier separating two fluids that allows species-selective transport between the fluids. A "fluid" may be a liquid or a gas.

In an embodiment, an aqueous solution is transported through the membranes of the invention, which requires that the membrane be permeable to an aqueous solution.

As used herein, the term "flux" is used to refer to the volume of solution or fluid flowing through a given membrane area during a given time.

As used herein, the term "critical flux" is used to refer to the permeate flux of a membrane system below which no fouling occurs. Ideally, for a clean system, water flux for a membrane is proportional to the applied transmembrane pressure (TMP). When flux passes its critical value, irreversible deposits and/or fouling start to begin, and flux starts to deviate from the linear relationship with TMP. From the concept of critical flux, when the membrane runs at a pressure lower than the corresponding pressure of critical flux it is defined as operating in the "sub-critical flux" zone. Subsequently, when a membrane runs at a pressure higher than the critical flux pressure it is operating in the "supercritical flux" zone. Theoretically, when the membrane operates in the sub-critical flux zone, the particle-membrane repulsive force and/or the subsequent back diffusion is higher than the permeate drag force. At this region the membrane flux remains constant over time.

As used herein, nanoscale refers to the size of objects being less than 2000 nm and greater than 1 nm.

This invention provides patterned membranes and methods of making and using these membranes. In certain embodiments, the membranes used are filtration membranes.

In more specific embodiments, the membranes are ultrafiltration (UF) membranes. As used herein, an ultrafiltration membrane is defined as one with a molecular weight cut off (MWCO) of between 1 and 1000 kDa. MWCO, as used herein, refers to the molecular weight of a component with 90% membrane retention. In an embodiment, an ultrafiltration membrane also has an effective pore size between about 2.5 and 120 nm.

In certain embodiments, the membranes are nanofiltration membranes. A nanofiltration membrane contains nanometer sized pores. In an embodiment, a nanofiltration membrane can reject solutes 1-10 nm in size.

In some embodiments, the membranes are microfiltration membranes. A microfiltration membrane has an effective pore size between 45 nm and 2500 nm.

The present invention is not limited to specific membrane materials and may include membranes suitable for microfiltration, such as polypropylene, poly(vinylidene fluoride), poly(tetrafluoroethylene), membranes suitable for ultrafiltration such as polysulfone, poly(ether sulfone), membranes suitable for nanofiltration such as polyamide, and membranes suitable for reverse osmosis such as polyamide, and combinations thereof.

The types of membranes of the present invention for ultrafiltration include materials such as poly(ether sulfone), polyacrylonitrile, polyvinylidene, regenerated cellulose, cellulose acetate, polysulfone, polypropylene, polyaryl ether sulfones, polyvinylidene fluoride, polyvinyl chloride, polyketones, polyether ketones, polytetrafluoroethylene, polyimides, and/or polyamides, and combinations thereof.

The types of membranes of the present invention for nanofiltration include materials such as cellulose acetate, polypiperazine amide, polyamides, polyethylene, polypropylene, polysulfones, poly(ether sulfone), polytetrafluoroethylene, polyvinylidenedifluoride, polyimides and/or polyacrylonitriles, and combinations thereof.

The types of membranes of the present invention for microfiltration include materials such as nylon, mixed cellulose esters, regenerated cellulose, cellulose acetate, polycarbonate, polytetrafluoroethylenes, polypropylene, polystyrene, polyvinylchloride, polysulfone, poly(ether sulfone), and/or polyethylene, and combinations thereof.

The types of membranes of the present invention for reverse osmosis include materials such as cellulose acetates, polypiperazine amide, and polyamides. Embodiments herein may include one or more of: poly(methyl methacrylate), polystyrenes, polycarbonates, polyimides, epoxy resins, cyclic olefin copolymers, cyclic olefin polymers, acrylate or methacrylate polymers, polyethylene terephthalate, polyphenylene vinylene, polyether ether ketone, poly(N-vinylcarbazole), acrylonitrile-styrene copolymer, polyetherimide, poly(phenylenevinylene), polysulfones, sulfonated polysulfones, copolymers of styrene and acrylonitrile, poly(tetrafluoroethylene), poly(ethylene-co-propylene-co-diene), poly (arylene oxide), polycarbonate, cellulose acetate, piperazine-containing polymers, polyelectrolytes, styrene-containing copolymers, acrylonitrilestyrene copolymers, styrene-butadiene copolymers, styrene-vinylbenzylhalide copolymers, cellulosic polymers, cellulose acetate-butyrate, cellulose propionate, ethyl cellulose, methyl cellulose, nitrocellulose, polyamides, polyimides, aryl polyamides, aryl polyimides, polyethers, poly(arylene oxides), poly(phenylene oxide), poly(xylene oxide), poly(esteramide-diisocyanate), polyurethanes, polyesters (including polyarylates), poly(alkyl methacrylates), poly(acrylates), poly(phenylene terephthalate), polysulfides, poly(ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl acetate), poly(vinyl propionate), poly(vinyl pyridines), poly(vinyl pyrrolidones), poly (vinyl ethers), poly(vinyl ketones), poly(vinyl aldehydes), poly(vinyl formal), poly(vinyl butyral), poly(vinyl amides), poly(vinyl amines), poly(vinyl urethanes), poly(vinyl ureas), poly(vinyl phosphates), poly(vinyl sulfates), polyallyls; poly(benzobenzimidazole), polyhydrazides, polyoxadiazoles, polytriazoles, poly(benzimidazole), polycarbodiimides, polyphosphazines and combinations thereof.

In further embodiments, the membrane is selected from a glassy polymer and polydimethylsiloxane, and combinations thereof.

Patterning of the membranes can be performed using any method known in the art. In certain embodiments, the membranes are patterned by nanolithography. Nanolithography creates nanoscale shapes on the surface of a membrane. These shapes may be formed by generating raised or depressed portions on the membrane. These shapes can include ridges that form a series of projections, parallel lines, intersecting lines, concentric lines, spheres and/or other shapes. Projections may include one or more of hills, posts, peaks, needles, pins, and/or knobs. Advantageously, the shapes have sizes (periodicity and/or amplitude) less than 2 microns and down to as little as 10 nm. It has been found that shapes of this size inhibit fouling to an unexpected degree as compared to prior art membranes.

In certain embodiments, membranes of the present invention with a pattern of parallel ridges further include additional ridges that intersect the parallel ridges. In certain embodiments, the additional ridges are parallel to each other. In certain embodiments, the additional ridges are about perpendicular to the said original parallel ridges. In certain embodiments, the additional ridges intersect the said original parallel ridges at an angle of between 0.01 and 90°.

In certain embodiments, a base membrane is manufactured in a fashion suitable for commercial applications, a pattern is formed of a material compatible with the base membrane, and the pattern is added to the base membrane.

In certain embodiments, a membrane for fluid transfer is formed by nanolithography of a pattern on at least one surface, wherein the membrane has at least 10% reduced mass transfer of surface-accumulative soluble and/or suspended species and particulates from the fluid to the membrane surface, while the fluid is transferred through the membrane, as compared to the base membrane without the pattern. In certain of these embodiments, the reduced mass transfer of surface-accumulative soluble and/or soluble species and particulates is at least 20, 30, 40, 50, 60, 70, 80, 90 or 100% reduced.

In certain embodiments, the membrane for fluid transfer is formed by nanolithography of a pattern on at least one surface, wherein the membrane has at least a 5% increase in the weak form of the critical flux for any mixture of fluids and/or fluids and solutes and/or fluids and particles, while the fluid with higher permeance is transferred through the membrane, as compared to the base membrane without the pattern.

According to one specific embodiment, the membranes are provided with a pattern of a series of parallel ridges or projections. Each of these ridges or projections forms peaks when the membrane is viewed in profile, and the space between them forms valleys. In certain embodiments, the average distance between each peak, also defined as the period or periodicity, is between 10 and 2000 nm. In other embodiments, the average distance between each peak is 10, 20, 30, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1500 or 2000 nm. In other embodiments, the periodicity is between 600 and 800 nm. In one embodiment, the periodicity is, on average, about 834 nm.

As described, herein a valley width refers to the average lateral distance between two points on the membrane at the average height of the membrane when viewed in profile. In certain embodiments, the average valley width is between 10 and 800 nm. In other embodiments, the average valley width is 10, 50, 100, 150, 200, 250, 300, 350, 400, 450, 500, 550, 600, 650, 700, 750 or 800 nm.

In certain embodiments, the depth, also defined as the amplitude, of the valley is between 10 and 600 nm. In other embodiments, the average amplitude of the valley is 10, 20, 30, 50, 100, 150, 200, 250, 300, 350, 400, 450, 500, 550 or 600 nm.

Different sized patterns can be used to filter different sized particles. In certain embodiments, the average valley width and/or amplitude of the membrane is smaller than the average particle size to be filtered. In certain embodiments, the average valley width and/or amplitude is 99% of the average particle size to be filtered. In other embodiments, the average valley width and/or amplitude is 120, 110, 100, 95, 90, 85, 80, 75, 70, 65, 60, 55 or 50% of the average particle size to be filtered.

A theoretical relationship from Darcy's law predicts higher volumetric flow with increased surface area of the membrane:

$$q = \frac{\Delta p \cdot A}{\mu \cdot R}$$

where q is the volumetric flow, $\Delta p$ is the applied pressure, $\mu$ is the viscosity, R is the membrane resistance, and A is the surface area of the membrane.

The membranes of the present invention may be used for pretreatment of process water and post treatment for ultrapure water, and are capable of filtering components such as high molecular-weight substances, colloidal materials, proteins and viruses.

The disclosure also provides methods of using the patterned membranes described herein to filter fluids. The filtration can be performed by passing the fluid through the membrane. In certain embodiments, the fluids are liquids such as polar or non-polar solvents. In embodiments, a polar solvent may be one or more of water, dichloromethane, tetrahydrofuran, ethyl acetate, acetone, dimethylformamide, acetonitrile, dimethyl sulfoxide, propylene carbonate, formic acid, n-butanol, isopropanol, n-propanol, ethanol, methanol and acetic acid. In other embodiments, a non-polar solvent may be one or more of pentane, cyclopentane, hexane, cyclohexane, benzene, toluene, 1,4-dioxane, chloroform, and diethyl ether. In another embodiment, the fluid is a gas.

Filters as described herein may be used to remove particles from solvents. The particles can be of various sizes. In certain embodiments, the particles are, on average, between 10 and 1510 nm. In other embodiments, the particles are, on average, 10, 20, 30, 50, 75, 100, 125, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500 or 1510 nm in diameter. In certain embodiments, the particles are between 1 and 1000 kDa in mass. In other embodiments, the particles are 0.1, 1, 50, 100, 150, 200, 250, 300, 350, 400, 450, 500, 550, 600, 650, 700, 750, 800, 850, 900, 950, or 1000 kDa in mass. According to the methods of filtration described herein, filtration can be performed at any temperature. In certain embodiments, filtration is performed at room temperature (e.g., between 18 and 25° C.). In other embodiments, filtration is performed between 1 and 50° C.

In other embodiments, filtration is performed at 1, 5, 10, 15, 20, 25, 30, 35, 40, 45 or 50° C.

TABLE 1

| Sub-Critical flux (L·m$^{-2}$·h$^{-1}$) | Average particle size (nm) | Average membrane valley width (nm) |
|---|---|---|
| 1-40 | 250 | 200-600 |
| 1-60 | 500 | 200-600 |

According to certain embodiments, filtration is performed at a sub-critical flux. Examples of potential sub-critical fluxes for different particle sizes and membrane valley widths are provided below.

The critical flux can be calculated for various combinations of patterned membranes and average particle sizes as shown in the Examples section below.

According to the methods of filtration described herein, filtration can be performed at any pressure. In certain embodiments, filtration is performed at between 6 and 51 psi. In other embodiments, filtration is performed at 6, 10, 15, 20, 25, 30, 35, 40, 45, 50 or 51 psi.

A particular embodiment includes a method of filtering a component with a molecular weight of between 0.1 and 1000 kDa from an aqueous solution. The method includes passing the aqueous solution containing the component through a membrane as disclosed herein. In a further embodiment, this method is performed at a sub-critical flux. In yet a further embodiment, the sub-critical flux is above 40 L·m$^{-2}$·h$^{-1}$. In a further embodiment, the critical flux may be between 40 and 60 L·m$^{-2}$·h$^{-1}$ or between 60 and 90 L·m$^{-2}$·h$^{-1}$. In another embodiment, the critical flux is above 60 L·m$^{-2}$·h$^{-1}$ when the component has an average particle size of 500 nm in diameter.

A particular embodiment includes a method of filtering a component with a molecular weight of between 0.1 and 1000 kDa from an aqueous solution. The method includes passing the aqueous solution containing the component through a membrane as disclosed herein, wherein the critical flux is between 5-90 L·m$^{-2}$·h$^{-1}$ when the component has an average aqueous diffusion coefficient at 298 K between $4\times10^{-13}$ m$^2$/s to $4\times10^{-9}$ m$^2$/s.

An embodiment also provides methods of producing patterned membranes. These methods include the use of nanoimprint lithography (NIL). The NIL used can be embossing NIL or step-and-flash NIL. When embossing NIL is used, in certain embodiments, the membrane is applied to a rigid mold including the pattern to be placed on the membrane under pressure and increased temperature for a certain period of time. The pressure is then released and the temperature lowered. Then the membrane is separated from the mold resulting in the pattern from the mold being embossed on the membrane. In certain embodiments, the rigid mold is made of silicon, while in other embodiments the rigid mold is made of polymer, metal, glass, ceramic, composite or combinations thereof; in particular the mold may be made of a very hard and thermally stable polymer. In certain embodiments, the temperature is increased to above a glass transition temperature of the membrane. However, in specific embodiments, the membrane need not be heated to this degree. Temperatures used to emboss a pattern onto a membrane can range between 50 and 200° C. In other embodiments, the temperatures are 50, 60, 70, 80, 90, 100, 110, 120, 130, 140, 150, 160, 170, 180, 190 or 200° C. In certain embodiments, the pressure is increased to emboss the pattern on the membrane from the mold. In specific embodiments, the pressure is increased to 1-10 MPa. In other embodiments, the pressure is increased to 1, 2, 3, 4, 5, 6, 7, 8, 9 or 10 MPa.

In certain embodiments, the membrane and mold are exposed to increased temperature and pressure for between 1 second and 10 minutes. In other embodiments, the membrane and mold are exposed to increased temperature and pressure for 1, 5, 10, 20, 30, 60, 90, 120, 150, 180, 210, 240, 270, 300, 330, 360, 390, 420, 450, 480, 510, 540, 570 and 600 seconds.

In certain embodiments, the temperature is decreased to below the glass transition temperature of the membrane after the pattern is embossed onto the membrane from the mold. However, in specific embodiments, the membrane may not need to be heated above the glass transition temperature. Decreased temperatures used to emboss a pattern onto a membrane can range between 25 and 100° C. In other embodiments, the temperatures are 25, 30, 40, 50, 60, 70, 80, 90 or 100° C.

In another embodiment, a method produces a patterned membrane using thermal embossing NIL. The method includes providing a membrane; pressurizing the membrane in a rigid mold under a pressure of 3-7 MPa (e.g., around 4 MPa for certain materials); heating the membrane to a temperature higher than the glass transition temperature of the membrane (e.g., between 100 and 150° C. for certain materials); cooling the membrane to a temperature lower than the glass transition temperature of the membrane (e.g., to about 40° C. for certain materials); and separating the membrane from the mold to produce the patterned membrane. The pressurizing and heating steps may be performed, for example, in about 180 seconds.

The present invention also provides an apparatus for imprinting a pattern by nanolithography on a membrane of the present invention.

EXAMPLES

Example 1

Construction and Physical Characterization of a Patterned (Textured) Membrane

Commercial ultrafiltration membranes were patterned/textured using a Nanoimprint Lithography (NIL) technique. NIL is a simple and reliable fabrication approach capable of creating nanoscale features, including sub-10 nm features, at low cost [49-51]. There are two types of NIL processes, namely thermal embossing NIL (TE-NIL), and step-and-flash NIL (SFNIL). With TE-NIL, a polymer film is pressurized by a rigid mold (typically Si) under relatively high pressure (3-7 MPa) and a temperature higher than the glass transition temperature (Tg) of the polymer. A replica is then created after the mold separation at temperature less than Tg. TE-NIL was used directly with a commercial ultrafiltration membrane in this experiment. Among all the types of membranes, an ultrafiltration (UF) membrane was chosen because of its broad range of application and rigid structure compared to other commercial membranes [52, 53].

Ultrafiltration is a pressure-driven membrane separation process that is used for concentration and purification of macromolecular solutions [53]. Pore size of ultrafiltration membranes is typically characterized by molecular weight cut-off (MWCO), which indicates the molecular weight of a component with 90% membrane retention. The MWCO of ultrafiltration membranes ranges between 1-1000 kDa.

PW ultrafiltration membrane (10 kDa MWCO, poly(ether sulfone)) from GE Infrastructure were used as commercial membranes in this study. These membranes are typically used for pretreatment of process water and post treatment for ultrapure water, and are capable of filtering high molecular-weight substances, colloidal materials, proteins and viruses. The UF membranes used in this study were supplied as flat sheets and were stored dry under ambient condition. No treatment of any sort was done on the membrane prior to the nanoimprinting.

Nanoimprinting of the ultrafiltration membrane was carried out on an Eitrie 3 (Obducat Inc) nanoimprinter. The mold applied was characterized by parallel lines with space gratings (834 nm periodicity, 200 nm groove depth) and consisted of a silicon oxide surface. The mold was treated with a piranha solution (sulfuric acid and hydrogen peroxide) prior to use. The patterning processes were carried out at 120° C. with a pressure of 4 MPa for 180 s. The mold was separated from the replica at 40° C. Typically NIL is done over the Tg of the polymer, but in this experiment we used a temperature which is well below the measured Tg of the poly(ether sulfone) which is around 183° C. The Tg of the porous films was determined by a nanoscale-thermal analysis (nano-TA). Detailed descriptions of the nano-TA techniques and their application to determine Tg of supported polymer thin films can be found elsewhere [54]. Imprinting at a temperature close to or higher than Tg of the membrane caused the porous structure of the membrane to collapse. The membranes used in this set of experiments became impermeable when imprinting was carried out at any temperature over 160° C. However, the porous structure of the poly(ether sulfone) membrane enabled imprinting at a temperature lower than the Tg without collapse of the porous structure. Therefore we believe that a useful temperature regime for the step of imprinting is the range of about 30° C. to 80° C. below Tg of a specific polymer. Also, the pressure of 4 MPa may vary for other polymer types; any pressure sufficient to produce an imprinted pattern may be chosen.

Membranes manufactured and used in embodiments herein may be patterned over their entire surfaces or the patterning may be limited to a working area of the filters. That is, outer regions or other regions of the membrane through which the fluid being filtered does not pass, that are typically used to affix the filter within a holder or fixture, need not be patterned. Also, although NIL was performed directly upon an existing, commercially available base membrane material in the experiment discussed here, it is contemplated that a patterned layer may he added to a base membrane in other ways. Material of the patterned layer may or may not be the same as the membrane, and either the patterned layer or the base membrane could be formed by methods including but not limited to NIL.

Figure 1B:
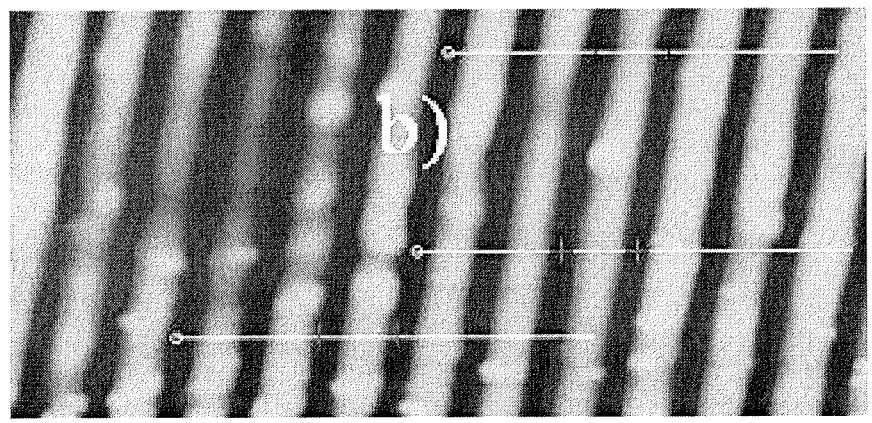
FIG. 1B shows a topographic AFM image of a patterned membrane, in accord with an embodiment.
Figure 1C:
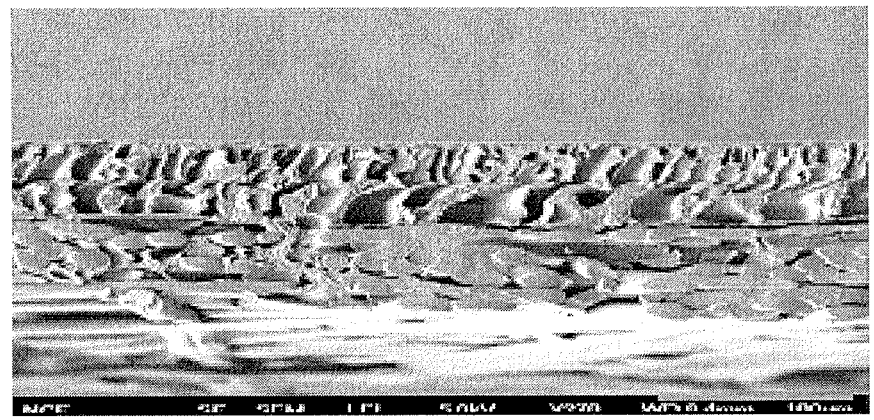
FIG. 1C shows a cross-sectional FE-SEM image of the patterned membrane of FIG. 1B.
Figure 1D:
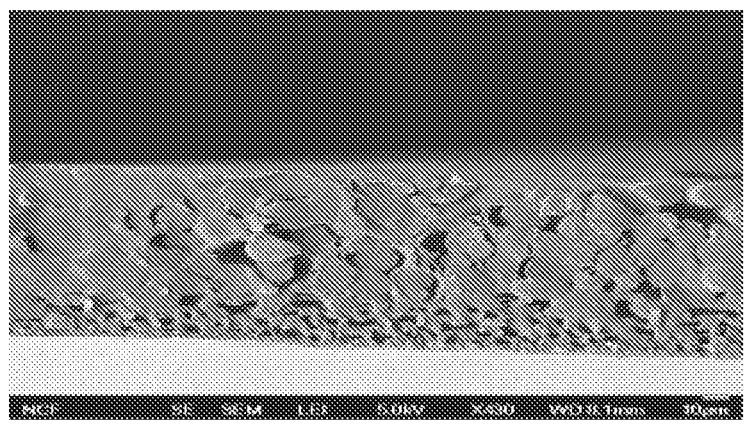
FIG. 1D shows a cross-sectional FE-SEM image of the pristine membrane of FIG. 1A.
Figure 1E:
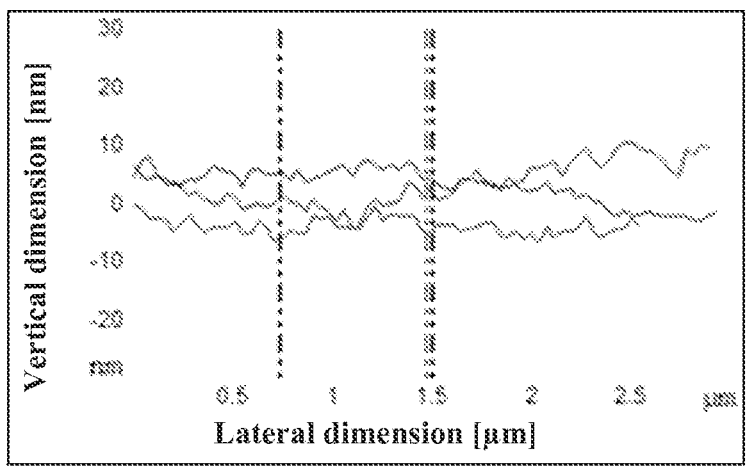
FIG. 1E is a line graph showing three profiles of the pristine membrane of FIG. 1A.
Figure 1F:
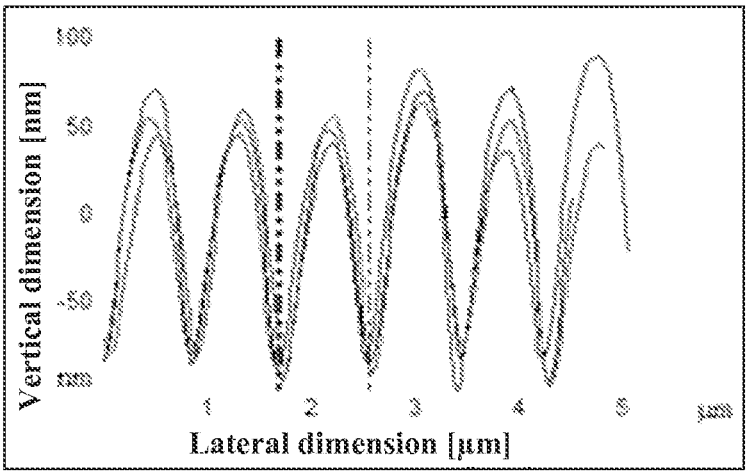
FIG. 1F is a line graph showing three profiles of the patterned membrane of FIG. 1B.

Atomic force microscopy (AFM) images of the pristine and patterned membrane are shown in FIGS. 1A and 1B. AFM measurements were conducted with a Dimension 3100 VEECO AFM using dimension tapping mode with silicon cantilever probes. A height image of the pristine membrane is shown in FIG. 1A. Horizontal lines in FIGS. 1A and 1B indicate locations that were scanned to produce corresponding cross-sectional profiles shown in FIGS. 1E and 1F respectively, and plus marks (+) on the horizontal lines indicate the positions labeled with vertical bars in FIGS. 1E and 1F. The pristine membrane initially had a roughness on the order of less than 10 nm. After imprinting, the average height of the membrane became ~120 nm, as shown in FIG. 1F. Note that, cross-sectional profile of the patterned membrane is not identical to that of the mold that was being used. This suggests that due to use of a lower temperature, unlike conventional NIL, viscous flow of the material could not be achieved. Evidently, the imprinting process became pressure dominant, resulting in depressed pattern height. We also examined the cross sectional morphology of the membrane before and after imprinting with a field emission scanning electron microscope (FE-SEM) (Zeiss, Supra 60). The cross sections of the membrane were cut using a microtome blade at very low temperature (−20° C.). The cross sectional SEM image of the pristine membrane is shown in FIG. 1D. The SEM images indicated that the membranes have asymmetrical structure with a skin layer at the top and a non-woven polyester support (PES) layer. FIG. 1C shows the cross sectional image of the patterned membrane. The SEM images indicate that the asymmetric structure in the PES was lost due to high compression, and the PES layer was compressed.

In view of the above results, a contemplated method of producing a filtration membrane includes generating nanoscale features on a membrane using NIL. The filtration membrane includes (1) a base membrane having a first surface, and a second surface counterfacing the first surface, and (2) a pattern, formed of a material compatible with the base membrane, that covers a working area of the first surface, the pattern forming features with periodicity and amplitude that do not exceed 1 micrometer in size. The pattern can be formed by imprinting the base membrane or by adding patterned material to the base membrane. The pattern reduces mass transfer of surface-accumulative soluble and/or suspended species and particulates from the solution to the membrane while the solution is passed through the membrane, as opposed to mass transfer of the surface-accumulative soluble and/or suspended species and particulates from the solution to the base membrane without the pattern.

Example 2

Use of Patterned Membranes in Filtration

Figure 2:
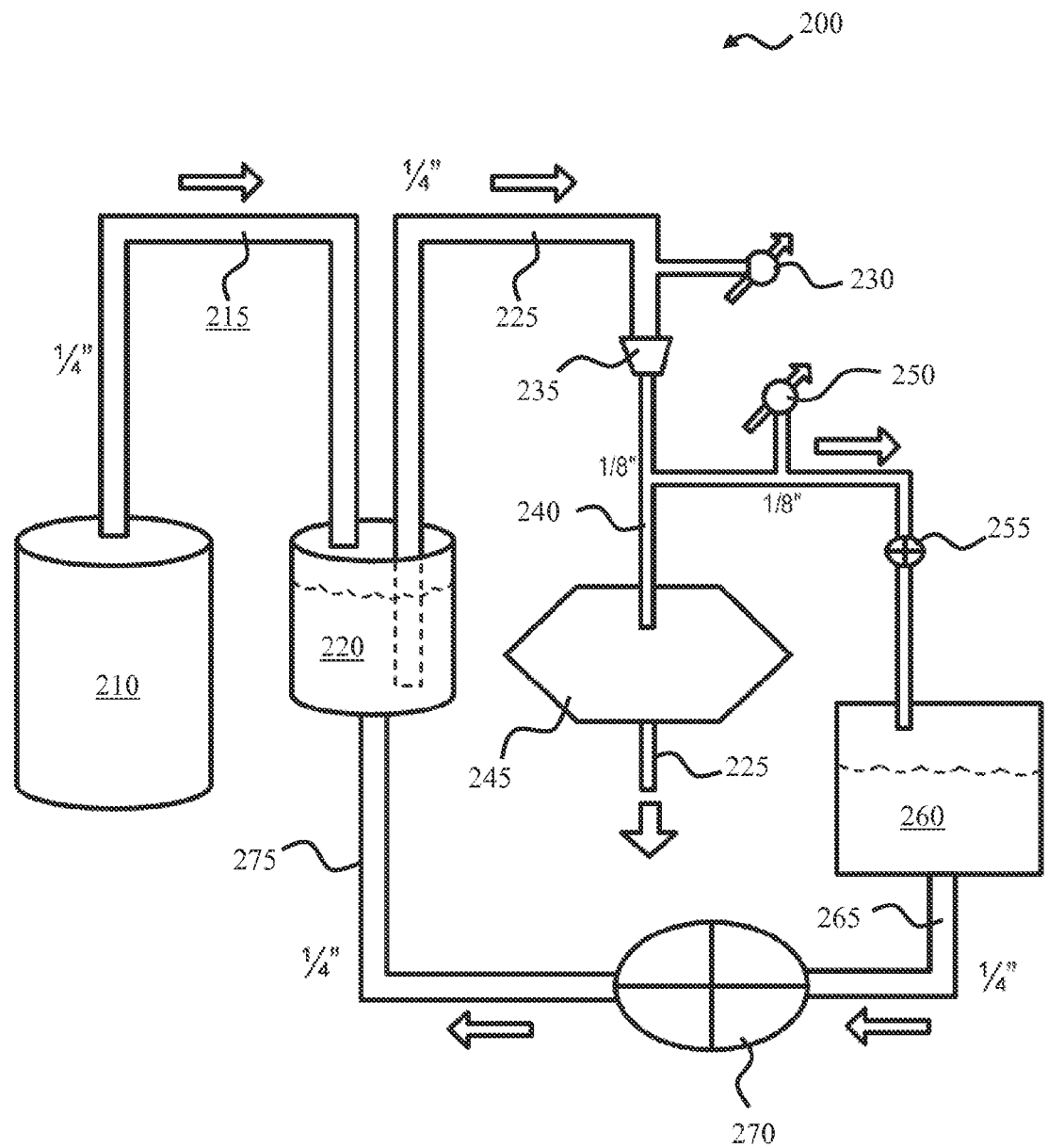
FIG. 2 is a schematic diagram of an experimental set up for evaluating a filtration membrane, in accord with an embodiment.

After the morphological study, filtration experiments were conducted to characterize mass transport and fouling characteristics of the patterned membranes. All the filtration experiments were carried out in a bench scale ultrafiltration apparatus 200 shown in FIG. 2. The apparatus is an unconventional crossflow type system where a feed flowed from a feed tank 220, through a ¼" tube 225 through a reducer 235, into a small diameter tube 240 (⅛ inch), and into a module 245 where it impinged on the center of a membrane coupon (not visible inside module 245) and flowed radially outward and upward along the sides to be collected by a larger diameter tube 225 (¼ inch), arranged so as to be co-annular to the feed, to a retentate side. The nature of the flow across the surface was essentially tangential and radial outward. The feed suspension was kept in a feed tank 220 made of stainless steel. A stirrer was used inside feed tank 220 at a constant rotation rate all the time to prohibit any deposition. The membrane had an effective membrane area of 1.93 cm$^2$. During the experiment, high pressure nitrogen in a tank 210 was used to supply pressure to tank 220 through a tube 215. Pressure gauges 230 and 250 monitored the pressure in tubes 225 and 240. All filtration experiments were carried out at room temperature (21° C.). Permeation flux is measured with an electronic balance (PI-225DA, Denver Instrument, USA) interfaced to a computer. Shear rate across the membrane surface was kept constant throughout the experiment by maintaining constant retentate volumetric flowrate using a flow regulator 255 draining to an open container 260. A peristaltic pump 270 (I/P easyload, Masterflex, USA) was used to recirculate the retentate from container 260 back into the feed suspension in tank 220 at a volumetric rate of 60 mL/min.

The fouling characteristics of the membrane were analyzed with the concept of "critical flux". Critical flux $J_{crit}$ is referred to herein as the permeate flux of a membrane system under which no fouling occurs. Ideally, for a clean system, flux for a membrane is always proportional to the applied transmembrane pressure (TMP). When flux passes its critical value for a solution/suspension, irreversible deposits and/or fouling begin, and flux starts to deviate from the linear relationship with TMP. Field et al. introduced the concept of critical flux for the first time in 1995, working on constant flux filtration of yeast cells with MF (microfiltration). The critical flux was defined as the flux below which an increase of TMP with time did not occur [55]. Howell et al. also confirmed the existence of a critical and a sub-critical flux, where for a particular flux, TMP remains constant with time [56]. Different types of experiments have been proposed by researchers to calculate/determine critical flux. Bacchin et al., Kwon et al. and other researchers measured transmembrane pressure necessary to maintain a given permeation flux across a membrane for silica suspensions by using a flux stepping method [57-59]. Several researchers also proposed a pressure stepping method to find critical flux when the TMP cannot attain steady state with time and where the flux-TMP relationship becomes non-linear [60, 61].

In this experiment, a pressure stepping method was used with a colloidal suspension, which has been used extensively to characterize critical flux. The theoretical background behind fouling of the membrane for colloidal suspensions is well known where the critical flux is generally a balance of particle-particle or particle-membrane repulsive forces and permeate drag forces [62, 63]. Above a given value of flux, when the repulsive forces are overcome by the permeate drag forces, a deposit forms on the membrane surface and creates an additional resistance to the permeate flow through the membrane. "AngstromSphere" silica particles of different sizes (Fiber Optic Center, MA, USA) were used in this experiment to make the colloidal suspension. These perfectly spherical silica particles are amorphous, non-porous and contain a large quantity of silanol (Si—OH) groups to facilitate dispersion in water. The colloidal suspensions were prepared by dispersing varying amounts of silica nanospheres in DI water with a drop of FL-70 surfactant and stirring vigorously over 12 hours. Prior to the filtration experiment, the solutions were sonicated using an ultrasonicator for a minimum of 60 minutes and allowed to cool to room temperature for 15 minutes.

Figure 3:
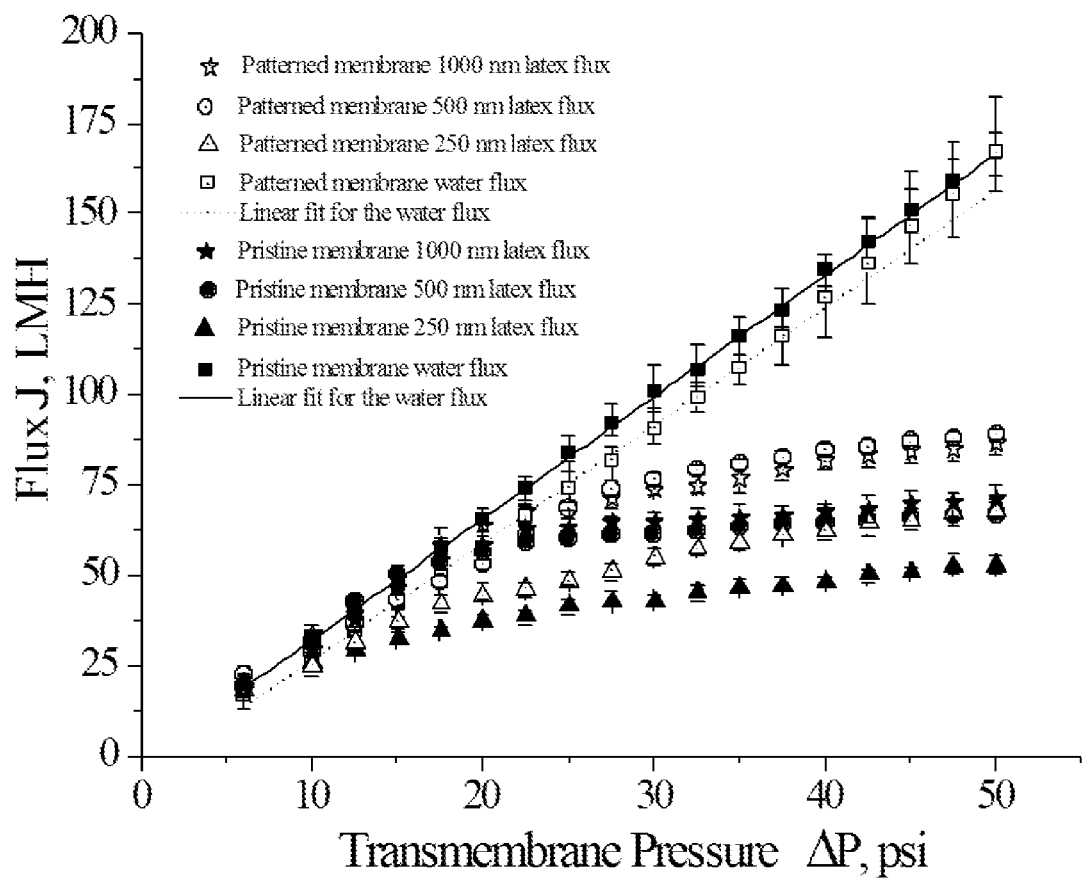
FIG. 3 is a line graph showing a relationship between applied transmembrane pressure and flux for pristine and patterned membranes, plotted as flux vs. transmembrane pressure, in accord with an embodiment.

FIG. 3 illustrates results of the critical flux experiment conducted with the colloidal suspensions and DI water. FIG. 3 is a line graph showing a relationship between applied transmembrane pressure and flux for pristine and patterned membranes, plotted as transmembrane pressure vs. flux for the filtration of water and colloidal suspension using latex particles at a concentration of 5 g $L^{-1}$ with a cross flow volumetric flowrate in the apparatus of 1.5 mL $s^{-1}$, in accord with an embodiment. Black (filled) symbols represent the permeability for the pristine membrane, while empty symbols represent the permeability of patterned membrane during water filtration and silica particle filtration. Square symbols represent permeability of pure water for both membranes. Water permeability for both pristine and patterned membrane are also fitted linearly, represented by solid and dotted lines respectively. Triangle, circle and star symbols correspond to permeability for colloidal suspensions of 250 nm, 500 nm, and 1000 nm latex particles respectively.

For each filtration experiment, deionized (DI) water was first permeated as a feed while varying pressure, and the pure water permeability $J_0$ was measured. For each sample DI water was filtered for 20 minutes at constant pressure. Pressure was increased linearly from 6 psi to 50 psi. As expected, the permeate flux for pure water increased linearly with the transmembrane pressure. Pristine water permeance is represented by black squares while water permeance for the patterned membranes are represented by the empty squares.

Despite the high compression imprinting, pure water permeability of the patterned membrane was found to be similar to the pristine one. From ~12% less permeability at the lower pressure, the pure water permeability reaches the pristine value at higher pressure. Swelling of the compressed pores of the patterned membrane at higher pressure might be the reason for this result. Water permeability for both pristine and patterned membrane were fit linearly and represented by solid and dotted lines respectively. The overall water permeability was calculated from the fit and is shown in Table 2, below.

TABLE 2

| Membrane type | Water Permeance, L/(m² · h · psi) | Critical Flux (250 nm), L/(m² · h) | Critical Flux (500 nm), L/(m² · h) | Critical Flux (1000 nm), L/(m² · h) |
|---|---|---|---|---|
| Pristine | 3.36 | 33 @ 15 psi | 51 @ 15 psi | 59 @ 20 psi |
| Patterned | 3.25 | 47 @ 22.5 psi | 74 @ 27.5 psi | 70 @ 25 psi |

Flux of the pristine and patterned membranes for colloidal suspension are plotted together in FIG. 3. Black (filled) triangle, circle and star symbols correspond to the permeability of the pristine membrane for the colloidal suspension for 250 nm, 500 nm, and 1000 nm latex particles respectively, while empty triangle, circle and star symbols represent the permeability of the pristine membrane for the colloidal suspension for 250 nm, 500 nm, and 1000 nm latex particles. Fouling started to occur at the point where the colloids' permeability starts to deviate from linear water permeability line.

All of the suspensions showed a strong form of critical flux, as they did not start to foul at the start. A strong form of critical flux measurement is particularly important, because it indicates that adsorption is negligible. This implies that the filtration was well-behaved such that fouling conditions depended on latex/silica-membrane interactions. For all of the experiments, the critical flux values and corresponding pressures are listed in Table 2. In the case of the pristine membrane with 250 nm particles, fouling started at 15 psi at a critical flux of ~33 L $m^{-2}$ $h^{-1}$. For the same particle size critical flux occurred in the patterned membrane at 22.5 psi at a critical flux of ~47 L $m^{-2}$ $h^{-1}$. For the colloidal suspension prepared with 500 nm silica particles, the pristine membrane started to foul at 15 psi at a critical flux of ~51 L $m^{-2}$ $h^{-1}$. For the same size of particle, the patterned membrane started to foul at 27.5 psi at a critical flux of ~74 L $m^{-2}$ $h^{-1}$. For the colloidal suspension of 1000 nm particles, the pristine membrane started to foul at 20 psi at a critical flux of ~59 L $m^{-2}$ $h^{-1}$. For the patterned membrane, fouling occurred at 25 psi at a critical flux of ~70 L $m^{-2}$ $h^{-1}$.

For the pristine membrane, 250 nm particles provided the lowest critical flux and 1000 nm particles yielded a higher critical flux. This observed trend is consistent with experimental findings of several researchers. Harmant and Aimar attributed this effect to coupling of different critical flux mechanisms of diffusion (higher for smaller particles) and surface interaction (higher for bigger particles). However, for all sizes of particles, critical flux was higher in patterned membranes than pristine membranes. The highest critical flux was found in the case of 500 nm particles, wherein flux increased by 45% before fouling. The trend of lower critical flux with smaller particle size was consistent with results for the pristine membrane. However, critical flux for 500 nm particles was higher than for 1000 nm particles. This indicated a size dependent hydrodynamic effect, of which the effect is dominant for the 500 nm particles. Note that the valley created by the imprinting process was 400 nm. While all other effects like adsorption and reversible fouling were not observed in this experiment, it is possible that the whole fouling effect was a consequence of hydrodynamics near the membrane surface. 500 nm particles taken together with 400 nm valleys may produce the best hydrodynamic effect, wherein the particle cannot occupy the whole valley. For 1000 nm particles, 400 nm valleys may be too small and particle-particle interactions might then be greater than particle-valley interactions.

To compare the fouling phenomena fully, fouling resistance $R_f$ was also calculated from filtration data. Theoretically, the relationship among the flux, the driving force and resistances for pure water can be expressed by Darcy's law:

$$J = \frac{\Delta p}{\mu \cdot R}$$

where, J is flux, $\Delta P$ is transmembrane pressure, $\mu$ is viscosity of the permeate solution, and R is resistance. After fouling, the equation can be changed to:

$$J = \frac{\Delta p - \pi}{\mu \cdot (R_m + R_f)}$$

where $R_m$ is the membrane resistance, calculated from pure water permeance, $R_f$ is the fouling resistance, the additional resistance provided the fouled layer, and $\pi$ is the osmotic pressure, which may be determined by concentration polarization. In these experiments, the effect of osmotic pressure by concentration polarization on flux was neglected due to the low osmotic coefficient of silica spheres.

Figure 4:
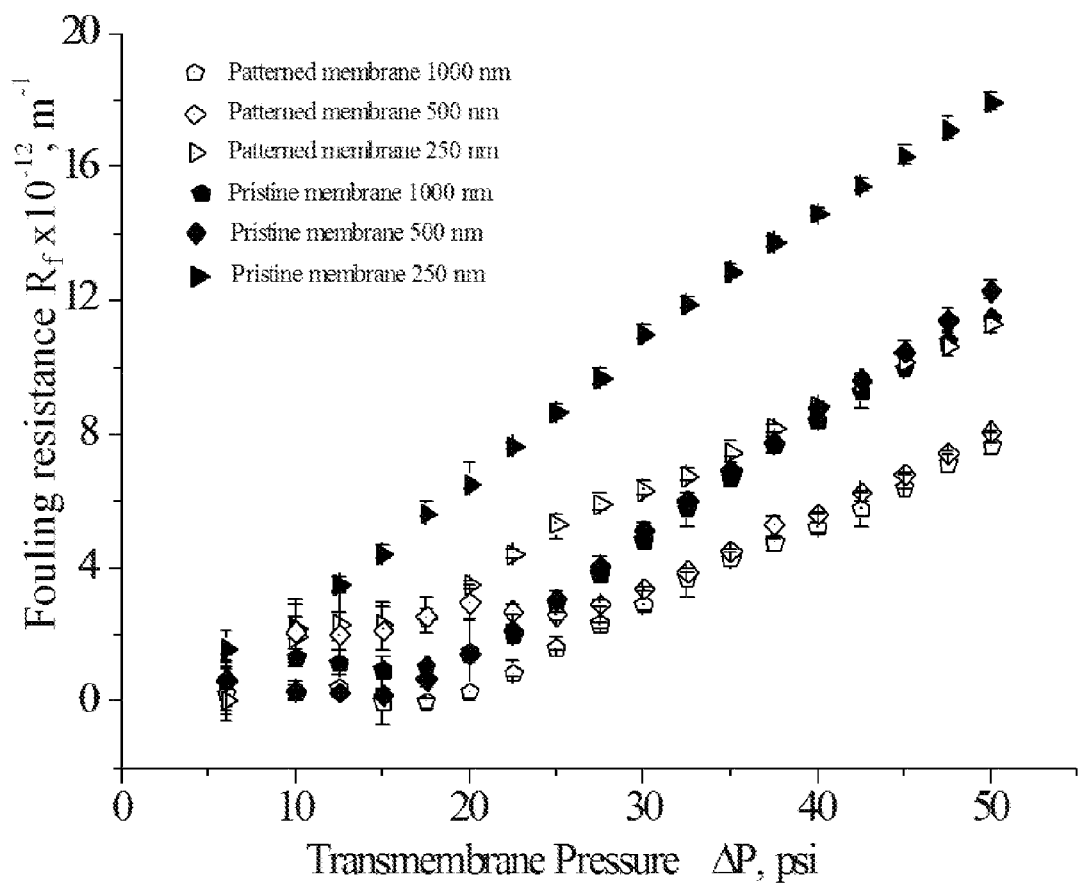
FIG. 4 is a line graph showing fouling resistance vs. transmembrane pressure measured at each pressure plotted for pristine and patterned membranes, in accord with an embodiment.

Fouling resistance at a constant pressure for all of the fouling experiments was calculated and plotted against TMP in FIG. 4, which is a line graph showing time dependent experimental data for a colloidal suspension with pristine and patterned membranes, in accord with an embodiment. Black (filled) symbols represent fouling resistance for all sizes of silica particles on pristine membranes, while empty symbols represent fouling resistance for patterned membranes. Right triangle, diamond and pentagon symbols represent fouling resistance for colloidal suspensions of 250 nm, 500 nm, and 1000 nm latex particles respectively. For all the colloidal suspensions, the initial fouling resistance values were relatively low and constant. The fouling and critical flux points could be easily identified as the points at which the fouling resistance started to increase with pressure. As expected from the TMP-flux plot in FIG. 3, fouling resistance for patterned membranes started later than for pristine membranes under corresponding conditions.

The 500 nm colloidal suspension for the patterned membrane started to foul later than any other membrane. While this outcome is consistent with the TMP-flux relationship, FIG. 4 provides additional information about the fouling build up. The slope of fouling resistance indicates how the fouling layer was building up on the membrane surface. The incremental rate of fouling resistance for the patterned membrane was also lower than that for the pristine membrane. In addition to the critical flux value, this indicated that not only does fouling develop at later stages on the patterned membrane compared to the pristine one, the fouling rate is also lower over the critical flux regime.

When the membrane runs at a pressure lower than the corresponding pressure of critical flux, it is defined as operating in a "sub-critical flux" zone. Subsequently, when membrane runs at a pressure higher than the critical flux pressure it is operating in a "super-critical flux" zone. Theoretically, when a membrane operates in the sub-critical zone, the particle-membrane repulsive force and/or the subsequent back diffusion is higher than the permeate drag force. In this zone, the membrane flux remains constant over time.

To inspect and verify the critical flux value obtained from the fouling experiment, a time dependent study was also conducted with a colloidal solution. A colloidal solution of 500 nm silica particles was used for the time dependent study. FIGS. 5A and 5B show the time dependent study for filtering a colloidal suspension with patterned and pristine membranes, respectively. For both membranes, two pressures were chosen. Because the critical flux for patterned membranes started at 27.5 psi, 22.5 psi was chosen as a point at which to operate in the sub-critical flux zone and 32.5 psi was chosen as a point at which to operate in the super-critical flux zone. For each pressure, filtration was conducted for 100 minutes while flux was recorded every two minutes.

FIG. 5A is a line graph showing time dependent experimental data for a colloidal suspension with a patterned membrane, in accord with an embodiment. In FIG. 5A, the graph shows results of a time dependent experiment for a patterned membrane at constant pressure, plotted as time vs. flux. Black diamond symbols represent the study operated at 22.5 psi and empty diamond symbols represent the study conducted at 32.5 psi. From the studies, it was evident that 22.5 psi remains in the sub-critical zone, as the flux remains pretty constant over 100 minutes of time, whereas for the pressure of 32.5 psi, in the super-critical zone, the membrane started to foul from the beginning The experiment implies that the critical flux definitely occurs in between 32.5 and 22.5 psi.

The same experiment with the same protocol was repeated for the pristine membrane. FIG. 5B is a line graph showing time dependent experimental data for a colloidal suspension with pristine membranes, in accord with an embodiment. In FIG. 5B, the graph shows results of a time dependent experiment for a pristine membrane at constant pressure plotted as time vs. flux. Because the critical flux in the case of pristine membrane for 500 nm colloidal solution was found to be 15 psi, 10 psi was chosen as a pressure for the sub-critical zone and 20 psi was chosen for super-critical flux. A consistent result was also found with the pristine membrane. Flux remained constant over time for the filtration running at 10 psi, while for 20 psi, the pristine membrane started to foul at the beginning.

Example 3

Characterization of Fouled Membranes

After filtration at super-critical flux, both fouled membranes (patterned and pristine) were characterized using SEM. Prior to the microscopic analysis, the membranes were dried at room temperature and pressure for 24 hours and were sputter coated with a 4.7 nm gold layer. FIG. 6A is a schematic showing a NIL-patterned membrane direction, and FIG. 6B is a schematic showing nine segments of an NIL-patterned membrane that were chosen for SEM analysis, with patterning in the direction represented in FIG. 6A, with arrows indicating direction of tangential radial flow relative to the pattern.

As shown in FIG. 6B, because of the existence of patterns, different portions of the patterned membrane had different orientations of the flow directions, relative to the pattern direction, over their surfaces. As an example, the pattern on segment 4, at the top of FIG. 6B, had a 90° orientation with respect to the flow, whereas segment 2 was oriented parallel with the flow.

The fouled patterned membrane was cut into 9 segments as shown in FIG. 6B. The top left image of FIG. 6B indicates the orientation of the pattern over the membrane and top right image shows how the segments were chosen for the microscopic analysis. For each sample, five images were taken across the surface to examine the distribution of the silica particles. The average values of the particles and the surface coverage were estimated from the SEM images, using ImageJ software (National Institute of Health, USA). Subsequently, the fouled pristine membrane was also divided into nine segments and characterized with SEM. Note that the pristine membrane did not have any differences in the flow direction versus surface patterns, because its surface had uniformly random roughness (see FIGS. 1A and 1E) over its surface. As was done for the patterned sample, nine images were taken across the surface of the fouled pristine sample at the same locations relative to the feed jet, and surface coverage was estimated using ImageJ. FIGS. 7A and 7B illustrate distribution of deposition of particles over the fouled membrane. FIG. 7A shows representative images for the patterned membrane, while FIG. 7B shows representative images for the pristine membrane. Surface coverage for all the segments, analysed by ImageJ, are reported in Table 3, below.

with the flow direction. Highest deposition (57.36% surface coverage) was found for the segments that were oriented parallel with flow. Obviously, the surface coverage showed strong correlation with the flow direction over the pattern. Theoretically, flow oriented perpendicularly over the pattern will generate more turbulence than other flow orientations. Subsequently, flow oriented parallel over the pattern will not generate any turbulence. The effect of turbulence was clearly evident here and it also seemed to affect the overall permeate drag. When surface coverage of segments of patterned membrane was compared with surface coverage of segments of pristine membrane, a much clearer picture was revealed. Unlike the patterned membrane, the pristine membrane did not possess any unique flow orientations over its surface, and consequently the deposition was random in all the segments. In addition, the deposition amount was found to be greater than that of the most fouled segments of the patterned membrane.

It is evident from the experiment that the patterned membrane was able to mitigate fouling better than the pristine one. Increased (and oriented) surface roughness in the patterned membrane stood out to be the only difference between these membranes. It is possible that improved surface roughness in the patterned membrane was able to increase particle-particle interaction or particle-surface repulsion force resulting in a greater back diffusion thereby mitigating the fouling. Increased roughness at the membrane surface should also increase the turbulence near the membrane surface. However, fluid dynamics may not be the sole reason behind the improved fouling resistance, as different sizes of foulants showed different fouling characteristics. Particle-surface interactions should also play a significant role. Much improved mitigation of fouling was found when the particle size was just slightly larger than the valley width. Ultimately, it is most likely the combination of improved fluid dynamics and higher particle-surface repulsive force that account for improved fouling resistance in the patterned membrane.

A pattern was created on a commercial membrane using NIL technology. This demonstrated a cost effective way to texture an existing commercial membrane which can also be used in mass production through roll to roll NIL. This is the first report of direct texturing of filtration membranes using such technology. Unlike conventional NIL processes, lower temperature imprinting is practical for texturing porous membranes. However, the pattern height achieved in this

TABLE 3

| MEMBRANE TYPE | SEGMENT | | | | | | | | |
|---|---|---|---|---|---|---|---|---|---|
| | 1 | 2 | 3 | 4 | 5 | 6 | 7 | 8 | 9 |
| PRISTINE | 69.8% | 58.99% | 66.29% | 54.99% | 51.62% | 69.05% | 72.72% | 75.46% | 76.81% |
| PATTERNED | 4.27% | 42.84% | 5.39% | 1.57% | 28.87% | 2.82% | 9.05% | 71.88% | 7.60% |

The overall deposition (fouling) for patterned membrane (19.4%) was found to be much less than the deposition (fouling) in the pristine membrane (66.2%). This explains the lower growth rate of the fouling resistance with patterned membrane. Small amounts of silica deposition on the membrane surface could indicate that cake build up was prohibited by higher permeate drag force during the filtration process. For that reason, the particles would remain destabilized, resulting in less deposition on the membrane surface.

Surprisingly even less deposition (2.2% surface coverage) was found for segments that were oriented perpendicularly process is about 45% depressed from the mold. Pore structures did sustain some change during the imprinting process, however, the pure water permeability for patterned membranes was found not to be far from the pristine membrane water permeability. By using line grating patterned membranes, fouling was also mitigated when compared to pristine membranes. About 45% increase of the critical flux was achieved using this simple form of texture. Interestingly, best fouling mitigation was achieved when the valley/groove was slightly smaller than the foulant's scale. Analogous conclusions were also stated by Brennan et al. when they investigated foulants of different size with textured polydimethylsiloxane (PDMS) [39]. In light of these results, it is contemplated that embodiments with features whose periodicity and/or amplitude are within a range of 60% to 100% of average particle size will provide useful fouling mitigation.

A patterned membrane not only increases the critical flux, but also lessens the deposition/fouling rate after fouling starts to occur. Microscopic analysis of the fouled membrane also revealed that deposition on the patterned membrane was about 70% less than the pristine membrane. Also, fouling deposition was found to be strongly correlated with the flow orientation over the patterned surface. For a region where the flow was oriented perpendicular to the surface, fouling deposition was found to be 97% less in the patterned membrane than in the pristine membrane.

In view of the above results, a method of filtering a component from a solution may include passing the solution including the component through a membrane that includes (1) a base membrane having a first surface and a second surface counterfacing the first surface, and the base membrane being formed of a material compatible with the solution, and (2) a pattern, formed of a material compatible with the base membrane and the solution, that covers a working area of the first surface, the pattern forming features with periodicity and amplitude that do not exceed 1 micrometer in size. The pattern can be formed by imprinting the base membrane or adding extra material to the base membrane. The pattern reduces mass transfer of surface-accumulative soluble and/or suspended species and particulates from the solution to the membrane while the solution is passed through the membrane, as opposed to mass transfer of the surface-accumulative soluble and/or suspended species and particulates from the solution to the base membrane without the pattern. The method can include adjusting one of flow and pressure of the solution to provide a sub-critical flux of the solution through the membrane. Pressure and/or flow that provide the sub-critical flux may be determined by characterizing fouling of a first membrane that includes an equivalent base membrane and an equivalent pattern by using a first quantity of the solution to identify a flow or pressure corresponding to a critical flux. Then, when the solution is passed through the membrane for the filtering, a second quantity of the solution may be passed through a second membrane that includes the same base membrane and pattern, using information from the characterizing step to adjust the one of the flow and the pressure to provide the sub-critical flux.

Example 4

NIL-Patterning Effect on Protein Ultrafiltration

Using the same experimental system as described in the previous example for colloidal particles, an experiment was performed to determine whether a pattern can enhance filtration performance of an ultrafiltration (UF) membrane by lowering adsorption of macromolecular solutes (proteins) onto the surface by increasing the localized fluid turbulence (local mixing) and/or lowering physicochemical attraction between the solute and the membrane's surface.

This initial study presents the results of a single patterning strategy on a commercial polyethersulfone (PES) UF membrane with a nominal MWCO of 10 kg/mol. The results show the following:

A pattern was created.

The pattern included a line-space grating with pitch 833 nm, line-space ratio=1, height: 40~100 nm.

The pattern did not adversely affect the membrane's baseline figure-of-merit.

The pattern did lower adsorption of a model protein on the surface.

The pattern lowered adsorption, increasing time-averaged productivity of the membrane.

Taken together, these results have economic value in a variety of current industrial applications.

Bovine Albumin Serum (BSA) is a well-recognized model foulant used in bioseparations and water treatment membrane studies. This experiment measured a clean membrane's resistance to pure water flow, its resistance to flow of a solution containing BSA, and how easily any deposited BSA can be removed. Thus, a quantity of BSA attached to the surface and strength of its attachment is determined.

Two types of membranes were used in this study: pristine (non-NIL patterned) and NIL-patterned, PES membranes. The solution consisted of 1 g/L BSA in phosphate buffer saline (PBS).

First, deionized (DI) water was filtered through the membrane at a constant transmembrane pressure, and permeance was determined during collection of 10 mL of permeate per $cm^2$ of membrane area. Then, the buffer solution was filtered at a constant pressure to determine permeance during collection of another 10 mL/$cm^2$ of permeate. BSA was added to the feed solution and filtered during collection of an additional 20 mL of permeate. The BSA feed was replaced with buffer solution, and steady state buffer permeance was again measured. The buffer feed was then replaced with DI water, and the whole cell was cleaned to remove the deposit. Finally, the flushing solution was replaced with buffer solution, and the permeance was measured again.

The results are summarized in FIGS. 8A, 8B, 9 and 10A-10D. FIGS. 8A and 8B show productivity of the membrane. The productivity of the membrane (value on the vertical axis) is different for the three solutions (DI water, buffer, and BSA+buffer) and changes with time because of:
1. the membrane compressing due to the applied pressure;
2. the viscosity of the solutions being different;
3. solutes being deposited on the membrane surface or within its pores.

FIG. 8A shows the productivity of a non-NIL-patterned membrane (aka pristine). The experimental steps described above (in the method) are the regions separated by the arrows. Step 1 was performed twice at two different pressures. All the measurement scenarios are shown sequentially. The labeled regions correspond to the measurement scenarios, as follows: Region 802 illustrates permeance of DI water at 30 PSI. Region 804 illustrates permeance of DI water at 40 PSI. Region 806 illustrates permeance of PBS alone at 40 PSI. Region 808 illustrates permeance of PBS+BSA at 40 PSI. Region 810 illustrates permeance of PBS alone, subsequent to the region 808 conditions. Region 812 illustrates permeance of PBS alone after the cleaning process.

FIG. 8B shows the productivity of an NIL-patterned membrane (note that the vertical scale is different from FIG. 8A). The same protocols were followed as for the non-NIL (pristine) membrane and the experimental steps as described above (in the method) are the regions separated by the arrows. Step 1 was done twice at two different pressures. All the measurement scenarios are shown sequentially. The labeled regions correspond to the measurement scenarios, as follows: Region 822 illustrates permeance of DI water at 30

PSI. Region 824 illustrates permeance of DI water at 40 PSI. Region 826 illustrates permeance of PBS alone at 40 PSI. Region 828 illustrates permeance of PBS+BSA at 40 PSI. Region 830 illustrates permeance of PBS alone, subsequent to the region 808 conditions. Region 832 illustrates permeance of PBS alone after the cleaning process.

As is evident from comparison of FIGS. 8A and 8B, the flux of PBS (the buffer) after cleaning is 2.5 times (0.3 g/min vs 0.12 g/min) greater for the NIL patterned versus non-NIL patterned (pristine) membrane.

Figure 9:
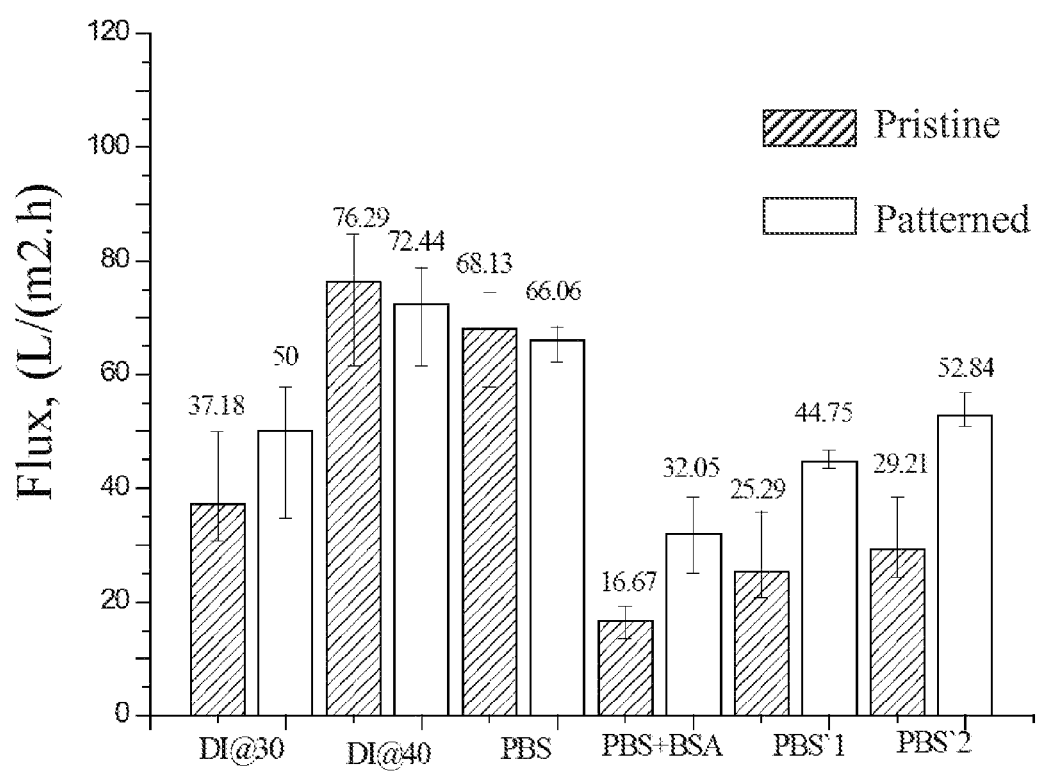
FIG. 9 illustrates flux versus filtration step for NIL-patterned membranes versus non-NIL patterned membranes, in accord with an embodiment. Each data point is the average value of measurements taken of three membranes, and each error bar represents standard deviation of the measurements.

FIG. 9 shows that the results were reproducible and that there appears to be a statistically significant advantange in productivity for the NIL (patterned) versus the non-NIL (pristine) membranes when subjected to similar protocols. Note that there is a small loss in pure water or buffer permeance (which is the same result we noted in the particle filtration examples), but during and after filtration with the fouling solution, the NIL-patterned membrane provides substantial improvement versus the non-NIL patterned (pristine) membrane.

Furthermore, adsorption of protein on the surface of the membranes was tested by the following procedure:
~80 mm$^2$ pieces of fouled filters were cut and sonicated in an ice bath for 60 min
Desorbed BSA in solution was measured by UV-Vis (@280 nm), as shown in Table 4, below.

The greater the amount (in mg/cm$^2$) in solution implies a greater amount adsorbed on the membrane after the experiment.

TABLE 4

| Membrane: | Test 1 | Test 2 |
| --- | --- | --- |
| NIL patterned | 2.025 mg/cm$^2$ | 1.37 mg/cm$^2$ |
| Non-NIL patterned (pristine) | 2.63 mg/cm$^2$ | 1.98 mg/cm$^2$ |

Scanning electron microscopy was also used to visualize deposition on surfaces. The surface of the NIL-patterned membranes (FIGS. 10C and 10D) appear cleaner than the surface of the non-NIL patterned (pristine) membranes (FIGS. 10A and 10B).

Figure 11A:
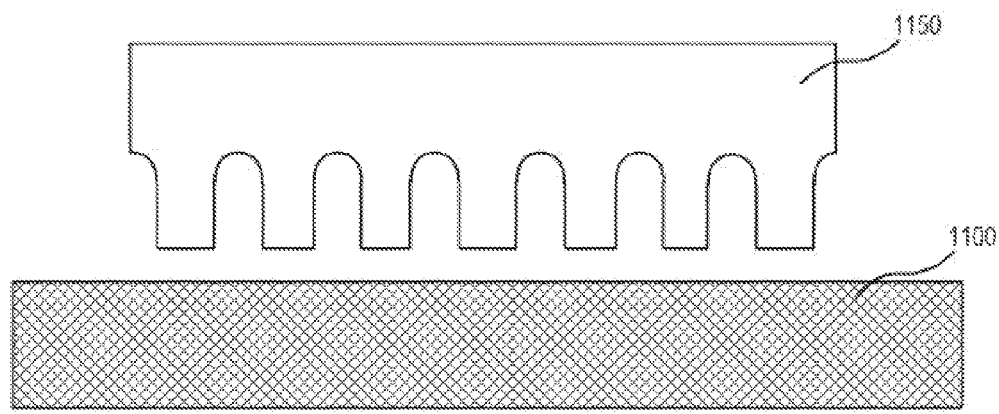
FIG. 11A schematically illustrates an imprinting mold positioned with respect to a base membrane, in an embodiment.

FIG. 11A schematically illustrates an imprinting mold 1150 positioned with respect to a base membrane 1100. Membrane 1100 is compatible with and permeable with respect to a solvent intended for filtration. Mold 1150 is rigid and is made, for example, of silicon, polymer, metal, glass, ceramic, composite or combinations thereof. Mold 1150 is shaped as a negative replica of a nanoscale pattern to be produced in the membrane.

Figure 11B:
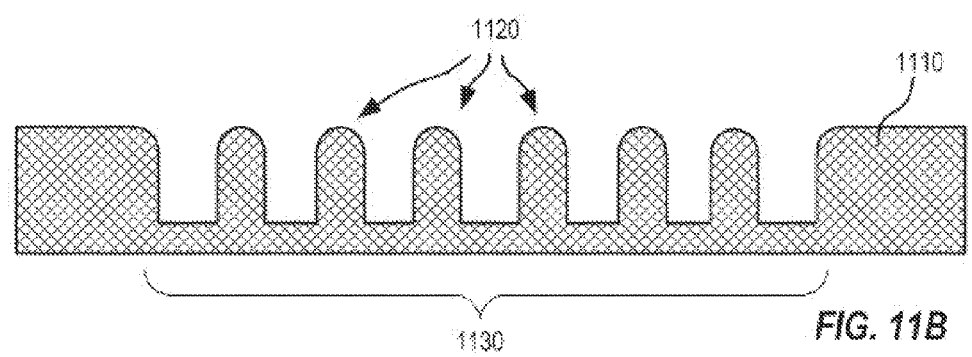
FIG. 11B schematically illustrates a patterned filtration membrane, in an embodiment.

Mold 1150 may be utilized to imprint a pattern into base membrane 1100, as discussed above, to produce a patterned filtration membrane 1110, shown in FIG. 11B. Membrane 1110 includes a pattern formed of features 1120 (only representative features 1120 are labeled in FIG. 11B, for clarity of illustration) in a working area 1130 of membrane 1110. Features 1120 may not be shown to scale, in particular, size, periodicity, aspect ratio and height of features 1120 with respect to base membrane 1100 may vary as required for a particular filtering scenario, as discussed above.

Figure 12:
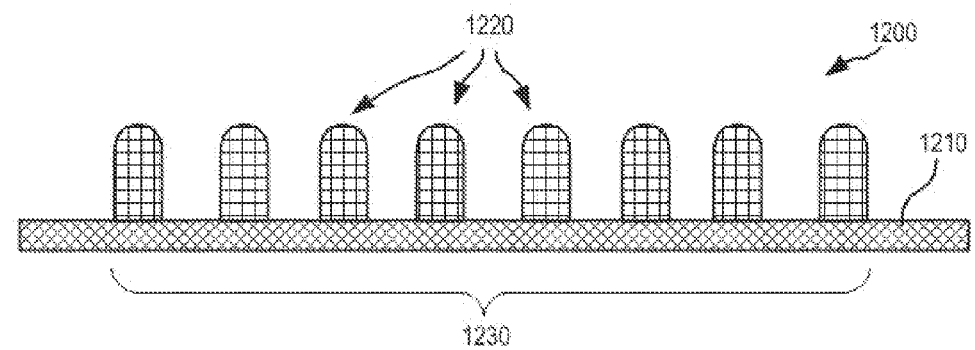
FIG. 12 schematically illustrates a filtration membrane formed of a pattern added to a base membrane, in an embodiment.

FIG. 12 schematically illustrates a filtration membrane 1200 formed of a pattern 1220 added to a base membrane 1210. Both base membrane 1210 and pattern 1220 are compatible with and permeable with respect to a solvent intended for filtration. FIG. 12 shows pattern 1220 only within a working area 1230 of membrane 1200, but pattern 1220 may extend partially or completely across base membrane 1210 outside of working area 1230 in other embodiments.

The references cited herein, including patents and publications, are hereby incorporated by reference in their entirety.

Combinations of Features

While this invention has been described with an emphasis upon certain embodiments, it will be obvious to those of ordinary skill in the art that variations of the embodiments may be used and that it is intended that the invention may be practiced otherwise than as specifically described herein. For example, the teachings herein are contemplated as being applicable in any combination, whether or not explicitly disclosed as such. Accordingly, this invention includes all modifications encompassed within the spirit and scope of the invention as defined by the claims that follow. In particular, it should be noted that the following specific combinations of features are possible:

a) In embodiments, a membrane for fluid transfer includes a base membrane having a first surface and a second surface counterfacing the first surface, and a pattern, formed of a material compatible with the base membrane, that covers a working area of the first surface, the pattern forming features with periodicity and amplitude that do not exceed 1 micrometer in size.

b) The membrane of item (a) may be formed by nanolithography after the membrane was manufactured in a fashion suitable for commercial applications.

c) Any of the membranes of items (a) or (b) may include a pattern formed, optionally by nanolithography, on at least one surface. Periodicity and/or amplitude of the pattern may be effective to reduce mass transfer of surface-accumulative soluble and/or suspended species and particulates from a fluid to the working area by at least 10%, as compared to mass transfer of surface-accumulative soluble and/or suspended species and particulates from the fluid to a working area of the base membrane without the pattern, when the fluid is transferred through the membrane.

d) Any of the membranes of items (a), (b) or (c) may reduce mass transfer of surface-accumulative soluble and/or soluble species and particulates by at least 20, 30, 40, 50, 60, 70, 80, 90, or 100%.

e) Any of the membranes of items (a) through (d) may be used to filter a liquid or a gas.

f) Any of the membranes of items (a) through (e) may be used to filter a polar solvent, especially a polar solvent selected from the group consisting of dichloromethane, tetrahydrofuran, ethyl acetate, acetone, dimethylformamide, acetonitrile, dimethyl sulfoxide, propylene carbonate, formic acid, n-butanol, isopropanol, n-propanol, ethanol, methanol, acetic acid and water.

g) Any of the membranes of items (a) through (e) may be used to filter a non-polar solvent, especially a non-polar solvent selected from the group consisting of pentane, cyclopentane, hexane, cyclohexane, benzene, toluene, 1,4-dioxane, chloroform, and diethyl ether.

h) Any of the membranes of items (a) through (g) may be a filtration membrane, an ultrafiltration membrane, a nanofiltration membrane, a microfiltration membrane or a reverse osmosis membrane.

i) Any of the membranes of items (a) through (h) may include a material selected from the group consisting of poly(ether sulfone), polyacrylonitrile, polyvinylidene, regenerated cellulose, cellulose acetate, polysulfone, polypropylene, polyarylether sulfones, polyvinylidene fluoride, polyvinyl chloride, polyketones, polyether ketones, polytetrafluoroethylene, polyimides and polyamides, polypiperazine amide, polyamides, polyethylene, polypropylene, polysulphones, polyethersulphones, polyvinylidenedifluoride, nylon, mixed cellulose esters, polycarbonate, polystyrene, polyvinylchloride, or a glassy or rubbery polymer including polydimethylsiloxane.

j) Any of the membranes of items (a) through (i) may include raised or depressed portions forming shapes on the membrane. The shapes may include projections, parallel lines, intersecting lines, concentric lines, ridges, valleys, channels, projections surrounded on one or both sides by a valley, hills, posts, peaks, needles, pins and/or knobs. Parallel lines may further include additional lines that intersect the parallel lines, and the additional lines may intersect the parallel lines at one or more angles between about 0.01 and 90°.

k) Any of the membranes of items (a) through (j) may include shapes arranged on the membrane with periodicity and/or amplitude between 10 and 1500 nm, 400 and 1000 nm or 600 and 800 nm. The shapes may have these sizes when measured at their widest point. Valleys or channels may have widths between 200 and 800 nm, 300 and 600 or about 400 nm at the average height of the membrane.

l) Methods of filtering a component from an aqueous solution may include passing the aqueous solution comprising the component through any of the membranes of items (a) through (k).

m) Methods of item (l) may include filtering a component having a molecular weight of between 0.1 and 1000 kDa and/or may be performed at a sub-critical flux.

n) In methods of item (m), the critical flux may be above 40 $L \cdot m^{-2} \cdot h^{-1}$ when the component has an average particle size of 250 nm in diameter, or the critical flux may be between 40 and 60 $L \cdot m^{-2} \cdot h^{-1}$, particularly between 60 and 90 $L \cdot m^{-2} \cdot h^{-1}$, and the critical flux may be above 60 $L \cdot m^{-2} \cdot h^{-1}$ when the component has an average particle size of 500 nm in diameter.

o) In methods of items (m) and/or (n), the critical flux may be between 5-90 $L \cdot m^{-2} \cdot h^{-1}$ when the component has an average aqueous diffusion coefficient at 298 K between $4 \times 10^{-13}$ $m^2/s$ to $4 \times 10^{-9}$ $m^2/s$.

p) A method of producing the membrane of items (a) through (k) may include nanoimprint lithography (NIL). The NIL may be thermal embossing NIL or step-and-flash NIL. Thermal embossing NIL may include providing a membrane, pressurizing the membrane in a rigid mold under a pressure of 3-7 MPa, heating the membrane to cause imprinting, cooling the membrane, and separating the membrane from the mold. Heating the membrane may include raising the membrane to a temperature between 100 and 150° C. Cooling the membrane may include lowering the membrane to a temperature lower than the glass transition temperature of the membrane, optionally around 40° C.

q) In the method of item (p), the rigid mold may be made of one or more of silicon, polymer, metal, glass, ceramic or composite.

r) A method of producing a membrane for fluid transfer may include forming a nanoscale pattern over a working area of a polymer membrane. Forming may include applying pressure to the working area of the polymer membrane with a rigid mold shaped as a negative replica of the nanoscale pattern, the pressure being sufficient to produce the nanoscale pattern in the polymer; heating the membrane to a temperature in the range of about 30° C. to 80° C. below Tg of the polymer; cooling the membrane while maintaining the pressure; and separating the membrane from the mold.

s) In the method of item (p), the rigid mold may include one or more of silicon, polymer, metal, glass, ceramic or composite.

REFERENCES

[1] P. LE-CLECH, V. CHEN, T. A. G. FANE, J. MEMBR. SCI. 2006, 284, 17.

[2] D. E. POTTS, R. C. AHLERT, S. S. WANG, DESALINATION 1981, 36, 235.

[3] D. RANA, T. MATSUURA, CHEMICAL REVIEWS, 110, 2448.

[4] M. C. PORTER, INDUSTRIAL & ENGINEERING CHEMISTRY PRODUCT RESEARCH AND DEVELOPMENT 1972, 11, 234.

[5] L. F. SONG, M. ELIMELECH, J. CHEM. SOC.-FARADAY TRANS. 1995, 91, 3389.

[6] K. H. CHOO, C. H. LEE, WATER RES. 1996, 30, 1771.

[7] X. H. ZHU, M. ELIMELECH, ENVIRON. SCI. TECHNOL. 1997, 31, 3654.

[8] G. B. VAN DEN BERG, C. A. SMOLDERS, J. MEMBR. SCI. 1992, 73, 103.

[9] A. MAARTENS, P. SWART, E. P. JACOBS, JOURNAL OF COLLOID AND INTERFACE SCIENCE 2000, 221, 137.

[10] A. V. R. REDDY, D. J. MOHAN, A. BHATTACHARYA, V. J. SHAH, P. K. GHOSH, J. MEMBR. SCI. 2003, 214, 211.

[11] X. MA, Y. SU, Q. SUN, Y. WANG, Z. JIANG, J. MEMBR. SCI. 2007, 300, 71.

[12] R. H. LI, T. A. BARBARI, J. MEMBR. SCI. 1995, 105, 71.

[13] I.-C. KIM, K.-H. LEE, DESALINATION 2006, 192, 246.

[14] A. ASATEKIN, E. A. OLIVETTI, A. M. MAYES, J. MEMBR. SCI. 2009, 332, 6.

[15] P. WANG, K. L. TAN, E. T. KANG, K. G. NEOH, JOURNAL OF MATERIALS CHEMISTRY 2001, 11, 783.

[16] F. F. STENGAARD, DESALINATION 1988, 70, 207.

[17] M.-X. HU, Q. YANG, Z.-K. XU, J. MEMBR. SCI. 2006, 285, 196.

[18] I. GANCARZ, G. POŁONIAK, M. BRYJAK, EUROPEAN POLYMER JOURNAL 1999, 35, 1419.

[19] I. GANCARZ, G. POŹNIAK, M. BRYJAK, EUROPEAN POLYMER JOURNAL 2000, 36, 1563.

[20] J. E. KILDUFF, S. MATTARAJ, J. P. PIERACCI, G. BELFORT, DESALINATION 2000, 132, 133.

[21] K. S. KIM, K. H. LEE, K. CHO, C. E. PARK, J. MEMBR. SCI. 2002, 199, 135.

[22] M. ULBRICHT, POLYMER 2006, 47, 2217.

[23] A. B. D. CASSIE, S. BAXTER, TRANSACTIONS OF THE FARADAY SOCIETY 1944, 40, 546.

[24] R. N. WENZEL, INDUSTRIAL & ENGINEERING CHEMISTRY 1936, 28, 988.

[25] N. J. SHIRTCLIFFE, G. MCHALE, M. I. NEWTON, G. CHABROL, C. C. PERRY, ADVANCED MATERIALS 2004, 16, 1929.

[26] E. MARTINES, K. SEUNARINE, H. MORGAN, N. GADEGAARD, C. D. W. WILKINSON, M. O. RIEHLE, NANO LETTERS 2005, 5, 2097.

[27] A. MARMUR, LANGMUIR 2004, 20, 3517.

[28] L. RICHERT, F. VETRONE, J.-H. YI, S. F. ZALZAL, J. D. WUEST, F. ROSEI, A. NANCI, ADVANCED MATERIALS 2008, 20, 1488.

[29] S. MICHIELSEN, H. J. LEE, LANGMUIR 2007, 23, 6004.

[30] L. FENG, S. H. LI, Y. S. LI, H. J. LI, L. J. ZHANG, J. ZHAI, Y. L. SONG, B. Q. LIU, L. JIANG, D. B. ZHU, ADVANCED MATERIALS 2002, 14, 1857.

[31] M. ELIMELECH, Z. XIAOHUA, A. E. CHILDRESS, H. SEUNGKWAN, J. MEMBR. SCI. 1997, 127, 101.

[32] M. Hirose, H. Ito, Y. Kamiyama, J. Membr. Sci. 1996, 121, 209.

[33] L. Yan, Y. S. Li, C. B. Xiang, S. Xianda, J. Membr. Sci. 2006, 276, 162.

[34] C. Cottin-Bizonne, J.-L. Barrat, L. Bocquet, E. Charlaix, Nat Mater 2003, 2, 237.

[35] R. M. Mc Donogh, H. Bauser, N. Stroh, U. Grauschopf, J. Membr. Sci. 1995, 104, 51.

[36] S. S. Varol, N. Yucel, H. Turkoglu, Heat and Mass Transfer 2000, 36, 103.

[37] S. Petronis, K. Berntsson, J. Gold, P. Gatenholm, Journal of Biomaterials Science, Polymer Edition 2000,11, 1051.

[38] Y. Ding, J. Sun, H. W. Ro, Z. Wang, J. Zhou, N. J. Lin, M. T. Cicerone, C. L. Soles, S. Lin-Gibson, Advanced Materials, 23, 421.

[39] M. L. Carman, T. G. Estes, A. W. Feinberg, J. F. Schumacher, W. Wilkerson, L. H. Wilson, M. E. Callow, J. A. Callow, A. B. Brennan, Biofouling 2006, 22, 11.

[40] C. J. Long, J. A. Finlay, M. E. Callow, J. A. Callow, A. B. Brennan, Biofouling, 26, 941.

[41] J. F. Schumacher, M. L. Carman, T. G. Estes, A. W. Feinberg, L. H. Wilson, M. E. Callow, J. A. Callow, J. A. Finlay, A. B. Brennan, Biofouling 2007, 23, 55.

[42] I. G. Rácz, J. G. Wassink, R. Klaassen, Desalination 1986, 60, 213.

[43] M. J. van der Waal, I. G. Racz, J. Membr. Sci. 1989, 40, 243.

[44] P. Izák, M. H. Godinho, P. Brogueira, J. L. Figueirinhas, J. G. Crespo, J. Membr. Sci. 2008, 321, 337.

[45] L. Vogelaar, J. N. Barsema, C. J. M. van Rijn, W. Nijdam, M. Wessling, Advanced Materials 2003, 15, 1385.

[46] L. Vogelaar, R. G. H. Lammertink, J. N. Barsema, W. Nijdam, L. A. M. Bolhuis-Versteeg, C. J. M. van Rijn, M. Wessling, Small 2005,1, 645.

[47] W. Nijdam, J. de Jong, C. J. M. van Rijn, T. Visser, L. Versteeg, G. Kapantaidakis, G. H. Koops, M. Wessling, J. Membr. Sci. 2005, 256, 209.

[48] M. Hashino, T. Katagiri, N. Kubota, Y. Ohmukai, T. Maruyama, H. Matsuyama, J. Membr. Sci., 366, 389.

[49] S. Y. Chou, P. R. Krauss, P. J. Renstrom, Science 1996, 272, 85.

[50] S. Y. Chou, P. R. Krauss, P. J. Renstrom, "Nanoimprint Lithography", 1996.

[51] L. J. Gou, Advanced Materials 2007, 19, 495.

[52] V. Lazarova, P. Savoye, M. L. Janex, E. R. Blatchley, M. Pommepuy, Water Sci. Technol. 1999, 40, 203.

[53] B. Van der Bruggen, C. Vandecasteele, T. Van Gestel, W. Doyen, R. Leysen, Environ. Prog. 2003, 22, 46.

[54] S. H. Maruf, D. U. Ahn, A. R. Greenberg, Y. Ding, Polymer, 52, 2643.

[55] R. W. Field, D. Wu, J. A. Howell, B. B. Gupta, J. Membr. Sci. 1995, 100, 259.

[56] J. A. Howell, J. Membr. Sci. 1995, 107, 165.

[57] P. Bacchin, P. Aimar, R. W. Field, J. Membr. Sci. 2006, 281, 42.

[58] B. Espinasse, P. Bacchin, P. Aimar, Desalination 2002, 146, 91.

[59] D. Y. Kwon, S. Vigneswaran, A. G. Fane, R. B. Aim, Separation and Purification Technology 2000, 19, 169.

[60] B. İ. t. Fradin, R. W. Field, Separation and Purification Technology 1999, 16, 25.

[61] G. Géan-Guiziou, R. J. Wakeman, G. Daufin, Chemical Engineering Journal 2002, 85, 27.

[62] E. M. Vrijenhoek, S. Hong, M. Elimelech, J. Membr. Sci. 2001, 188, 115.

[63] X. Zhu, M. Elimelech, Environ. Sci. Technol. 1997, 31, 3654

What is claimed is:

1. A patterned membrane for fluid transfer, comprising:
a base membrane having a first surface and a second surface counterfacing the first surface, the base membrane being permeable,
a pattern that covers a working area of the first surface, the pattern having been formed by imprinting the base membrane with features with a periodicity and an amplitude that do not exceed 1 micrometer in size,
wherein the base membrane remains permeable and the features of the pattern are permeable to a solvent fluid that is transported through the patterned membrane, and
wherein the patterned membrane obstructs, at the first surface, a mass transfer through the patterned membrane of at least surface-accumulative solutes and insoluble particles.

2. The patterned membrane of claim 1, the pattern being formed by nanolithography on the first surface, wherein the periodicity and amplitude of the pattern is further configured to obstruct, at the first surface, a portion, but not all, of the mass transfer through the patterned membrane of the surface-accumulative solutes and insoluble particles.

3. The patterned membrane of claim 1, wherein the base membrane and the pattern are comprised of a material that is capable of filtering a polar solvent selected from the group consisting dichloromethane, tetrahydrofuran, ethyl acetate, acetone, dimethylformamide, acetonitrile, dimethyl sulfoxide, propylene carbonate, formic acid, n-butanol, isopropanol, n-propanol, ethanol, methanol, acetic acid and water.

4. The patterned membrane of claim 1, wherein the base membrane and the pattern are comprised of a material that is capable of filtering a non-polar solvent selected from the group consisting of pentane, cyclopentane, hexane, cyclohexane, benzene, toluene, 1,4-dioxane, chloroform, and diethyl ether.

5. The patterned membrane of claim 1, wherein the base membrane is a reverse osmosis membrane, and at least one of the base membrane or the pattern comprises a material selected from the group consisting of cellulose acetates, polypiperazine amides, and polyamides.

6. The patterned membrane of claim 1, wherein the base membrane and the pattern are composed of a material that is capable of filtering a gas, and at least one of the base membrane or the pattern comprise polydimethylsiloxane.

7. The patterned membrane of claim 1, wherein the
the membrane is a microfiltration membrane, and pattern comprises raised or depressed portions that form shapes that include one or more of ridges, valleys, channels, hills, posts, peaks, needles, pins, knobs, parallel lines, intersecting lines or concentric lines on the patterned membrane.

8. The patterned membrane of claim 1, wherein the pattern comprises projections arranged on the base membrane, the periodicity of the projections being between 10 and 2000 nm.

9. The patterned membrane of claim 8, wherein the projections have a maximum width of between 300 and 500 nm.

10. The patterned membrane of claim 1, wherein pattern comprises one or more of parallel lines, intersecting lines, or concentric lines that form a projection surrounded on one or both sides by a valley, and
wherein the pattern further comprises a peak-to-valley height of between 100 and 300 nm.

11. The patterned membrane of claim 1, wherein:
the base membrane is an ultrafiltration membrane, and
at least one of the base membrane or the pattern comprise a material selected from the group consisting of poly (ether suflone), polyacrylonitrile, polyvinylidene, regenerated cellulose, cellulose acetate, polysulfone, polypropylene, polyarylether sulfones, polyvinylidene fluoride, polyvinyl chloride, polyketones, polyether ketones, polytetrafluoroethylene, polyimides, and polyamides.

12. The patterned membrane of claim 1, wherein:
the base membrane is a nanofiltration membrane, and
at least one of the base membrane or the pattern comprise a material selected from the group consisting of cellulose acetate, polypiperazine amide, polyamides, polyethylene, polypropylene, polysulphones, polyethersulphones, polytetrafluoroethylene, polyvinylidenedifluoride, polyimides, and polyacrylonitriles.

13. The patterned membrane of claim 1, wherein:
the base membrane is a microfiltration membrane, and
at least one of the base membrane and the pattern comprise a material selected from the group consisting of nylon, mixed cellulose esters, regenerated cellulose, cellulose acetate, polycarbonate, polytetrafluoroethylenes, polypropylene, polystyrene, polyvinylchloride, polysulfone, poly(ether sulfone), and polyethylene.

14. A patterned membrane for fluid transfer, comprising:
a base membrane having a first surface and a second surface counterfacing the first surface, the base membrane being permeable,
a pattern that covers a working area of the first surface, the pattern having been formed by a permeable material that is compatible with the base membrane, the pattern forming features with a periodicity and an amplitude that does not exceed 1 micrometer in size,
wherein the patterned membrane remains permeable to a solvent fluid that is transported through the patterned membrane, and
wherein the patterned membrane obstructs, at the first surface, a mass transfer through the patterned membrane of at least surface-accumulative solutes and insoluble particles.

15. The patterned membrane of claim 14, the pattern being formed by nanolithography on the first surface, wherein the periodicity and amplitude of the pattern is further configured to obstruct, at the first surface, a portion, but not all, of the mass transfer through the patterned membrane of the surface-accumulative solutes and insoluble particles.

16. The patterned membrane of claim 14, wherein the base membrane and the pattern are comprised of a material that is capable of filtering a polar solvent selected from the group consisting of dichloromethane, tetrahydrofuran, ethyl acetate, acetone, dimethylformamide, acetonitrile, dimethyl sulfoxide, propylene carbonate, formic acid, n-butanol, isopropanol, n-propanol, ethanol, methanol, acetic acid, and water.

17. The patterned membrane of claim 14, wherein the base membrane and the pattern are comprised of a material that is capable of filtering a non-polar solvent selected from the group consisting of pentane, cyclopentane, hexane, cyclohexane, benzene, toluene, 1,4-dioxane, chloroform and diethyl ether.

18. The patterned membrane of claim 14, wherein the base membrane is a reverse osmosis membrane, and at least one of the base membrane or the pattern comprises a material selected from the group consisting of cellulose acetates, polypiperazine amides, and polyamides.

19. The patterned membrane of claim 14, wherein the base membrane and the pattern are composed of a material that is capable of filtering a gas, and at least one of the base membrane or the pattern comprise polydimethylsiloxane.

20. The patterned membrane of claim 14, wherein the pattern comprises raised or depressed portions that form shapes that include one or more of ridges, valleys, channels, hills, posts, peaks, needles, pins, knobs, parallel lines, intersecting lines or concentric lines on the patterned membrane.

21. The patterned membrane of claim 14, wherein the pattern comprises projections arranged on the base membrane, the periodicity of the projections being between 10 and 2000 nm.

22. The patterned membrane of claim 21, wherein the projections have a maximum width of between 300 and 500 nm.

23. The patterned membrane of claim 14, wherein the pattern comprises one or more of parallel lines, intersecting lines, or concentric lines that form a projection surrounded on one or both sides by a valley and
wherein the pattern further comprises a peak-to-valley height of between 100 and 300 nm.

24. The patterned membrane of claim 14, wherein:
the base membrane is an ultrafiltration membrane, and
at least one of the base membrane or the pattern comprise a material selected from the group consisting of poly (ether suflone), polyacrylonitrile, polyvinylidene, regenerated cellulose, cellulose acetate, polysulfone, polypropylene, polyarylether sulfones, polyvinylidene fluoride, polyvinyl chloride, polyketones, polyether ketones, polytetrafluoroethylene, polyimides, and polyamides.

25. The patterned membrane of claim 14, wherein:
the base membrane is a nanofiltration membrane, and
at least one of the base membrane or the pattern comprise a material selected from the group consisting of cellulose acetate, polypiperazine amide, polyamides, polyethylene, polypropylene, polysulphones, polyethersulphones, polytetrafluoroethylene, polyvinylidenedifluoride, polyimides, and polyacrylonitriles.

26. The patterned membrane of claim 14, wherein:
the base membrane is a microfiltration membrane, and
at least one of the base membrane and the pattern comprise a material selected from the group consisting of nylon, mixed cellulose esters, regenerated cellulose, cellulose acetate, polycarbonate, polytetrafluoroethylenes, polypropylene, polystyrene, polyvinylchloride, polysulfone, poly(ether sulfone), and polyethylene.

27. A method filtering a component from a solution, comprising:
passing the solution comprising the component through a patterned membrane that includes:
a base membrane having a first surface and a second surface counterfacing the first surface, the base membrane being permeable,
a pattern that covers a working area of the first surface, the pattern having been formed by imprinting the base membrane with features with a periodicity and an amplitude that does not exceed 1 micrometer in size,
wherein the base membrane remains permeable and the features of the pattern are permeable to a solvent fluid that is transported through the patterned membrane, and wherein the patterned membrane obstructs, at the first surface, a mass transfer through the patterned membrane of at least surface-accumulative solutes and insoluble particles.

28. The method of claim 27, wherein the component has a molecular weight of between 0.1 and 1000 kDa.

29. The method claim 27, wherein the passing the solution comprises adjusting one of flow and pressure of the solution to provide a sub-critical flux of the solution through the membrane.

30. A method filtering a component from a solution, comprising:

passing the solution comprising the component through a patterned membrane that includes:

a base membrane having a first surface and a second surface counterfacing the first surface, the base membrane being permeable, a pattern that covers a working area of the first surface, the pattern having been formed by a permeable material that is compatible with the base membrane, the pattern forming features with a periodicity and an amplitude that does not exceed 1 micrometer in size, wherein the patterned membrane remains permeable to a solvent fluid that is transported through the patterned membrane, and wherein the patterned membrane obstructs, at the first surface, a mass transfer through the patterned membrane of at least surface-accumulative solutes and insoluble particles.

31. The method of claim 30, wherein the component has a molecular weight of between 0.1 and 1000 kDa.

32. The method claim 30, wherein the passing the solution comprises adjusting one of flow and pressure of the solution to provide a sub-critical flux of the solution through the membrane.

* * * * *